United States Patent
Lee et al.

(10) Patent No.: US 10,503,272 B2
(45) Date of Patent: Dec. 10, 2019

(54) MULTILINGUAL CHARACTER INPUT DEVICE

(71) Applicants: Gyu Hong Lee, Seoul (KR); DAESAN BIOTECH, Gimpo-si (KR); Gang Seon Yu, Gimpo-si (KR)

(72) Inventors: Gyu Hong Lee, Seoul (KR); Gang Seon Yu, Gimpo-si (KR)

(73) Assignees: Gyu Hong Lee, Seoul (KR); Daesan Biotech, Gyeonggi-Do (KR); Gang Seon Yu, Gyeonggi-Do (KR)

( * ) Notice: Subject to any disclaimer, the term of this patent is extended or adjusted under 35 U.S.C. 154(b) by 0 days.

(21) Appl. No.: 16/332,337

(22) PCT Filed: Sep. 22, 2017

(86) PCT No.: PCT/KR2017/010473
§ 371 (c)(1),
(2) Date: Mar. 11, 2019

(87) PCT Pub. No.: WO2018/056752
PCT Pub. Date: Mar. 29, 2018

(65) Prior Publication Data
US 2019/0235638 A1 Aug. 1, 2019

(30) Foreign Application Priority Data
Sep. 23, 2016 (KR) .................. 10-2016-0121855

(51) Int. Cl.
*G06F 3/02* (2006.01)
*G06F 3/023* (2006.01)

(52) U.S. Cl.
CPC .......... *G06F 3/0219* (2013.01); *G06F 3/0235* (2013.01); *G06F 3/0236* (2013.01)

(58) Field of Classification Search
CPC ..... G06F 3/0219; G06F 3/0236; G06F 3/0235
See application file for complete search history.

(56) References Cited

U.S. PATENT DOCUMENTS 5,210,689 A * 5/1993 Baker ................... G06F 3/0489
341/22
5,661,476 A * 8/1997 Wang .................... G06F 3/0235
341/22

(Continued)

FOREIGN PATENT DOCUMENTS

KR 1020010107497 A 12/2001
KR 200298234 B1 12/2002

(Continued)

*Primary Examiner* — Dmitriy Bolotin
(74) *Attorney, Agent, or Firm* — Umberg Zipser LLP

(57) ABSTRACT

Disclosed is a multilingual character input device. The multilingual character input device comprising a keyboard unit for displaying character phonemes converted from characters per language in a software-selected country on a key and selectively receiving the input of the displayed character phonemes; a display unit for displaying the received input character on a display; a storage unit for storing character phonemes, a list of data and a program; and, a control unit for controlling the keyboard unit and the display unit, wherein, the keyboard unit comprises: a numeric/symbol keys section for displaying numbers and symbols disposed at an upper part; an F keys section disposed below the numeric/symbol keys section for displaying functions, characters or preset functions and plurality of F keys are addible; a character keys section disposed below the F keys section for displaying basic phonemes of each language, and; a plurality of additional keys in the character keys section for displaying variant phonemes or preset symbols, wherein if language conversion is performed through a language conversion key of the keyboard unit, a language exceeding the phoneme number of the character keys section is assigned to the F keys section and the plurality of additional keys so as to display all character phonemes, so that the input of the characters for each language is received by one key stroke.

16 Claims, 24 Drawing Sheets

(56) References Cited

U.S. PATENT DOCUMENTS

| | | | |
|---|---|---|---|
| 2007/0250650 A1* | 10/2007 | Fux | G06F 3/0236 |
| | | | 710/67 |
| 2008/0115084 A1* | 5/2008 | Scott | G06F 3/04817 |
| | | | 715/810 |
| 2009/0189865 A1* | 7/2009 | Mishra | G06F 3/018 |
| | | | 345/173 |
| 2010/0110015 A1* | 5/2010 | Ahn | G06F 3/0219 |
| | | | 345/171 |
| 2010/0259484 A1* | 10/2010 | Jo | G06F 3/018 |
| | | | 345/171 |
| 2015/0193410 A1* | 7/2015 | Jin | G06F 17/24 |
| | | | 715/256 |
| 2016/0026258 A1* | 1/2016 | Ou | G06F 17/276 |
| | | | 715/773 |

FOREIGN PATENT DOCUMENTS

| | | |
|---|---|---|
| KR | 200299428 B1 | 12/2002 |
| KR | 200448924 B1 | 5/2010 |
| KR | 1020120057735 A | 6/2012 |
| KR | 2020130006861 A | 11/2013 |
| KR | 101373552 B1 | 3/2014 |
| KR | 1020150083173 A | 7/2015 |

* cited by examiner

[FIG. 1]
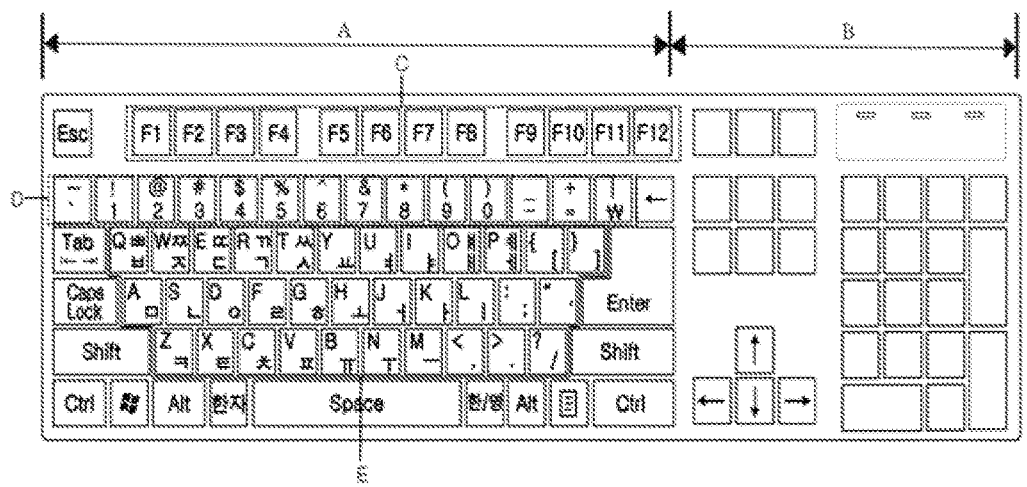
[FIG. 2]
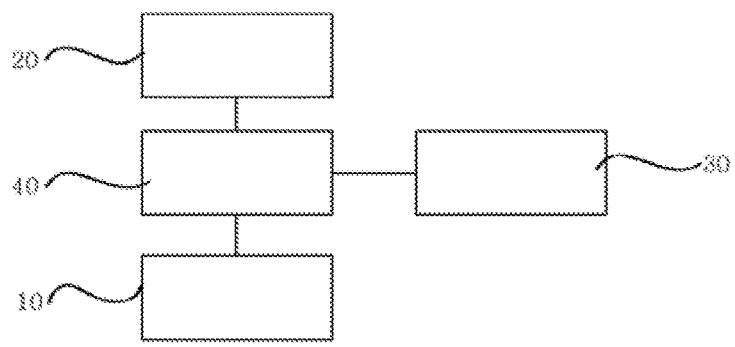

[FIG. 3A]
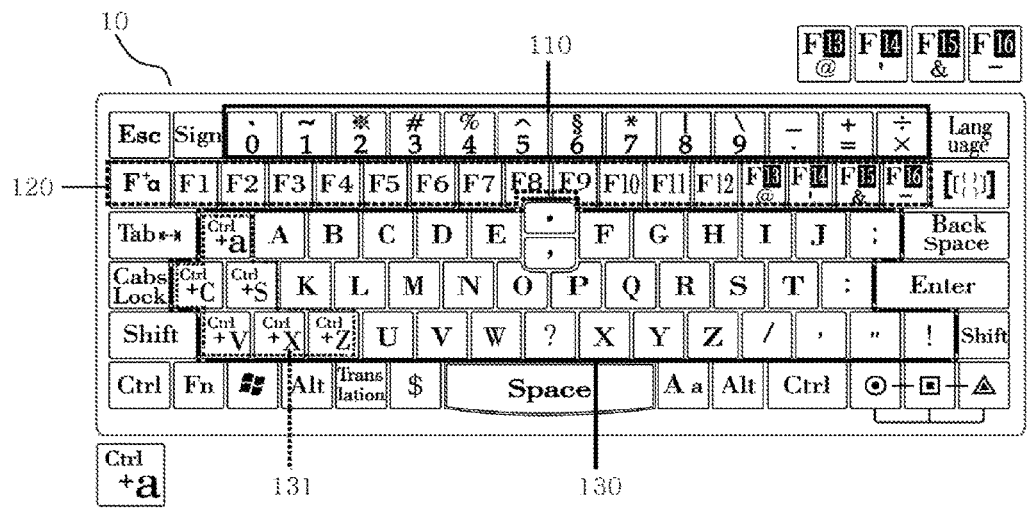
[FIG. 3B]
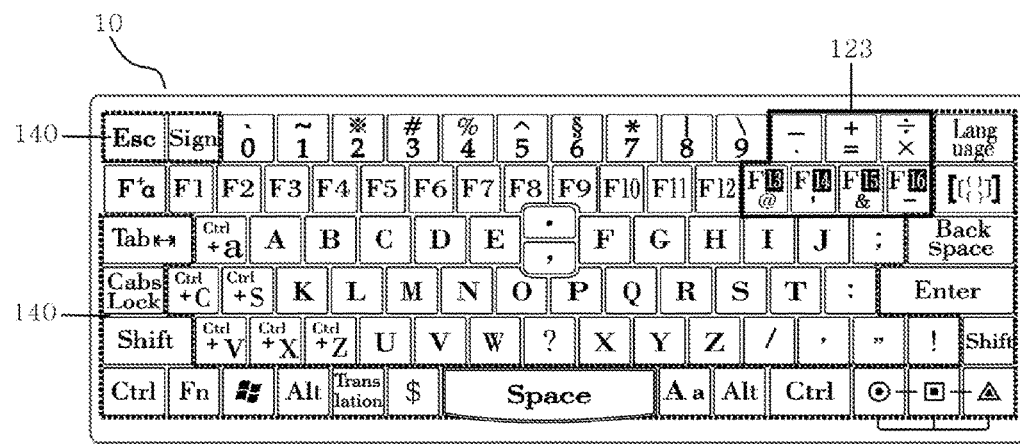

[FIG. 4A]
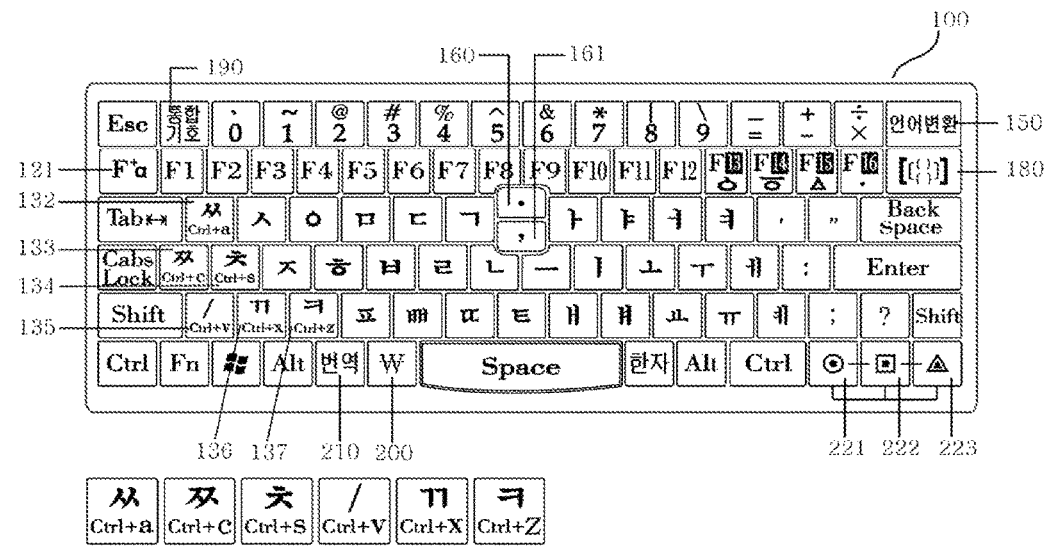
[FIG. 4B]
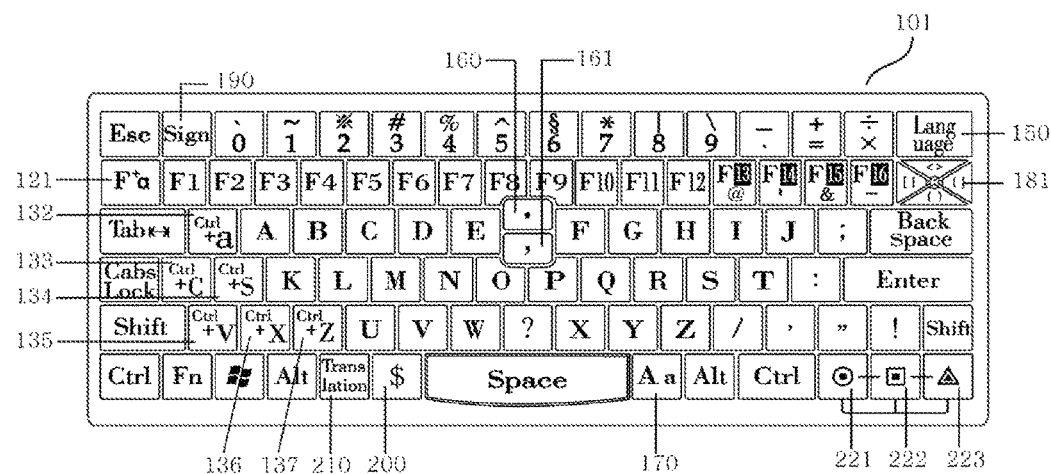

[FIG. 4C]
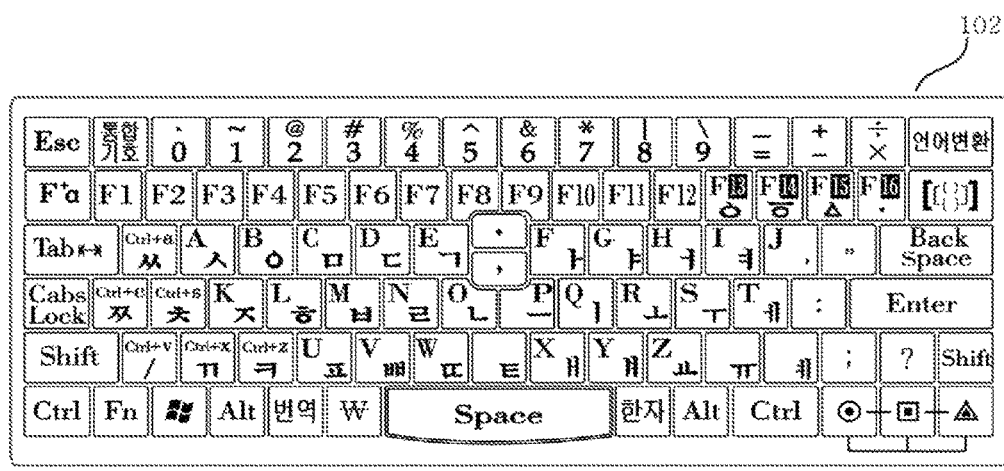
[FIG. 5]
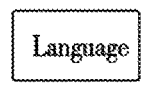
150
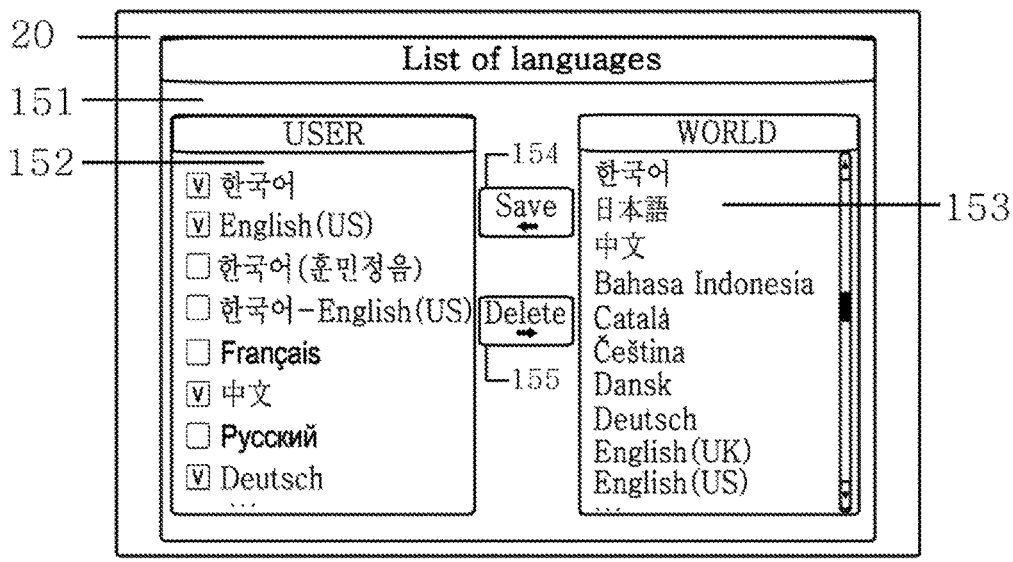

[FIG. 6]
(a)
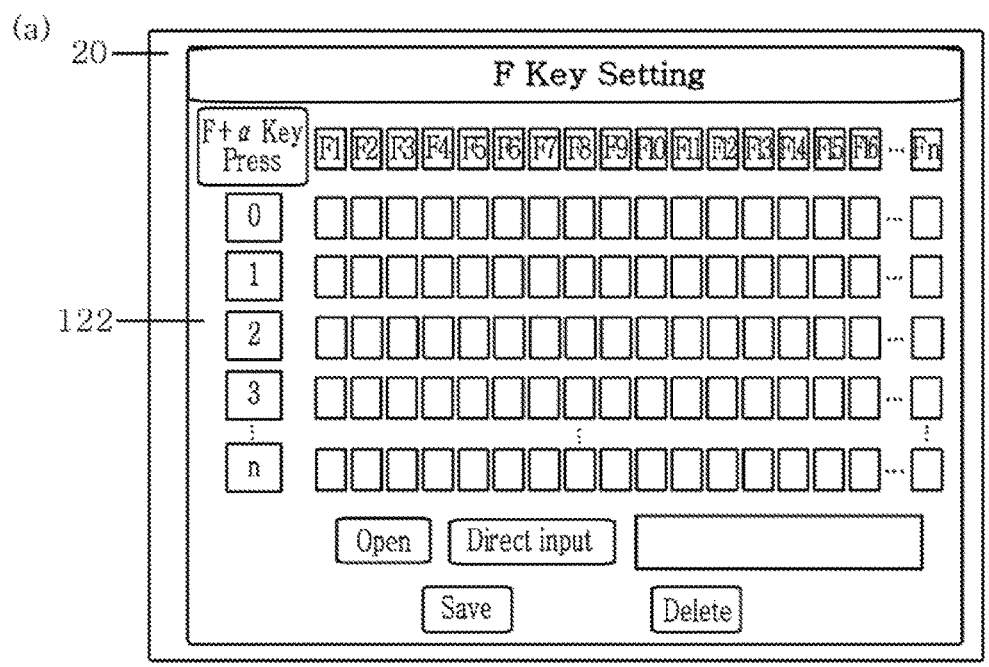
(b)
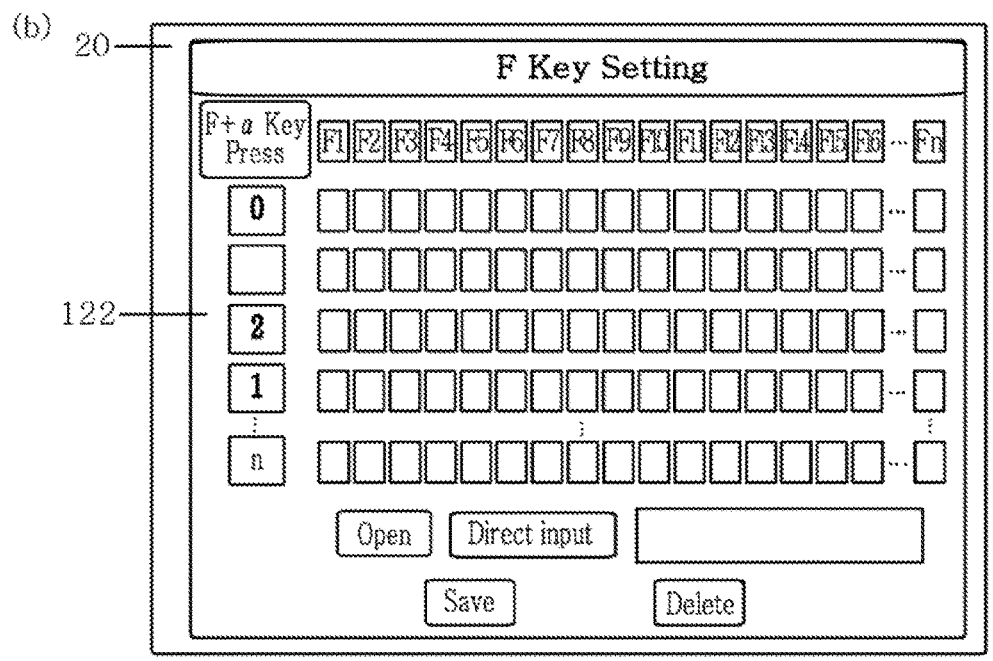

[FIG. 7A]
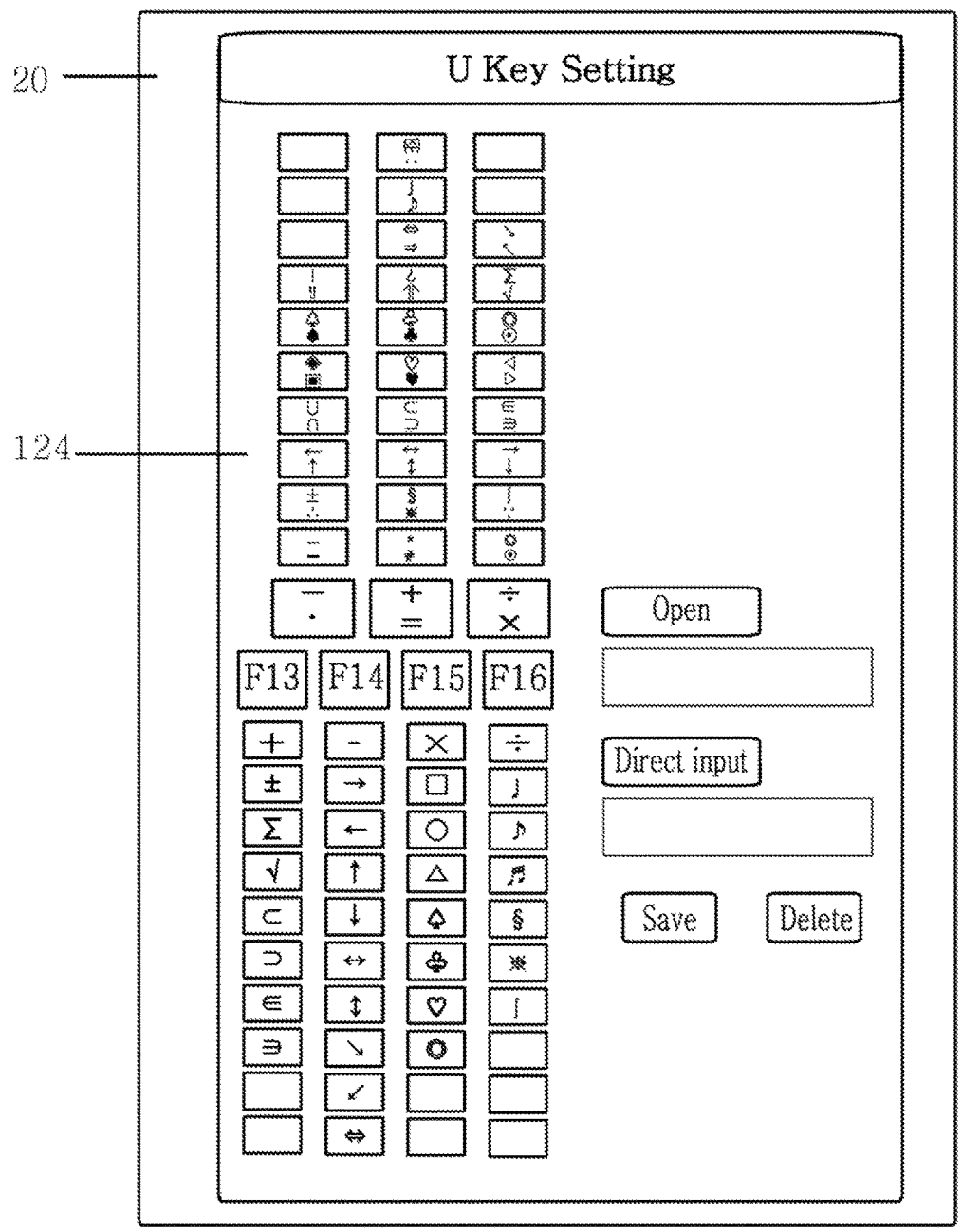

[FIG. 7B]
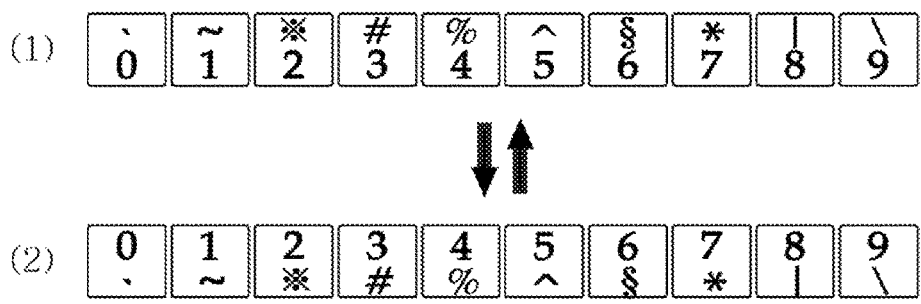
[FIG. 7C]
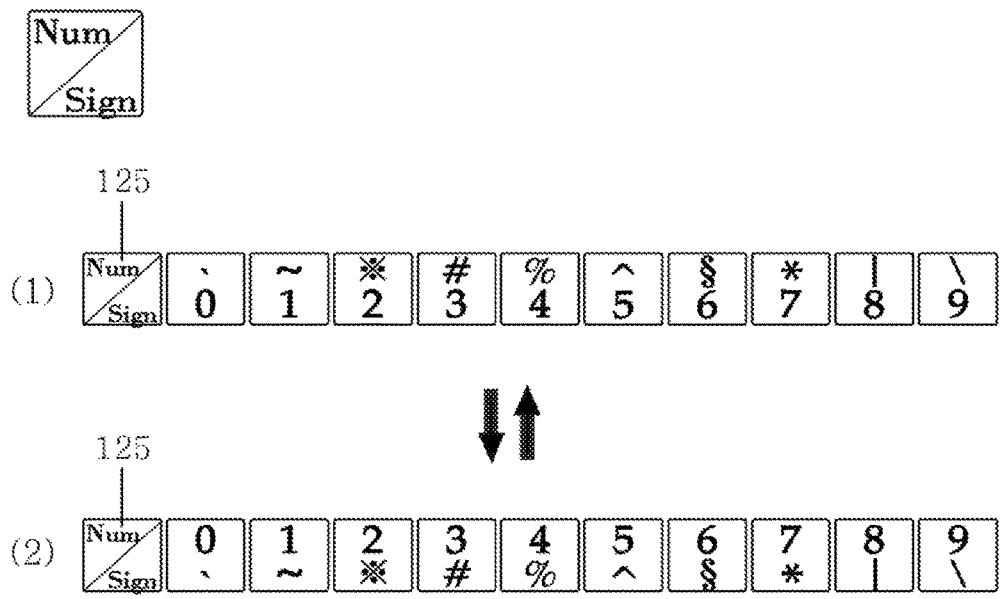

[FIG. 8]
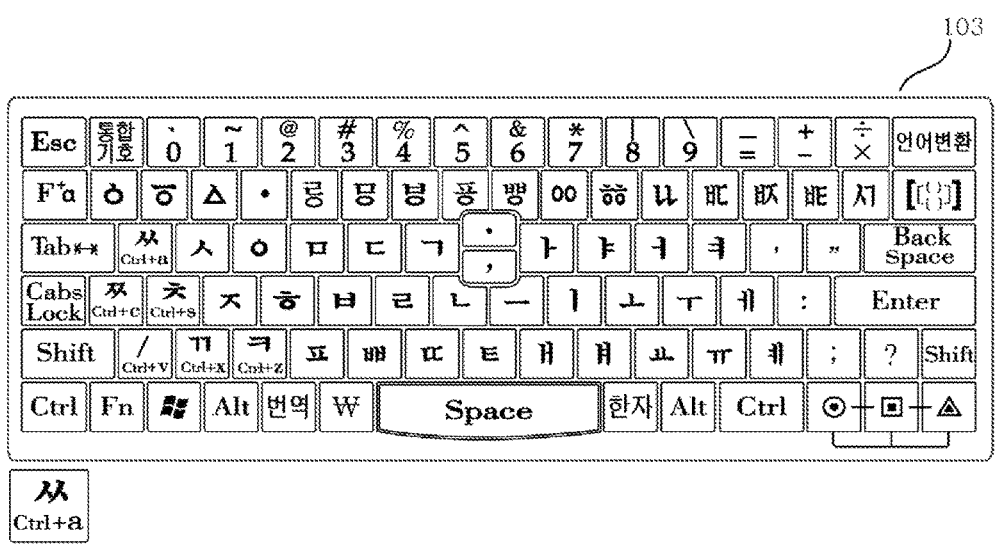

[FIG. 9A]
(1)
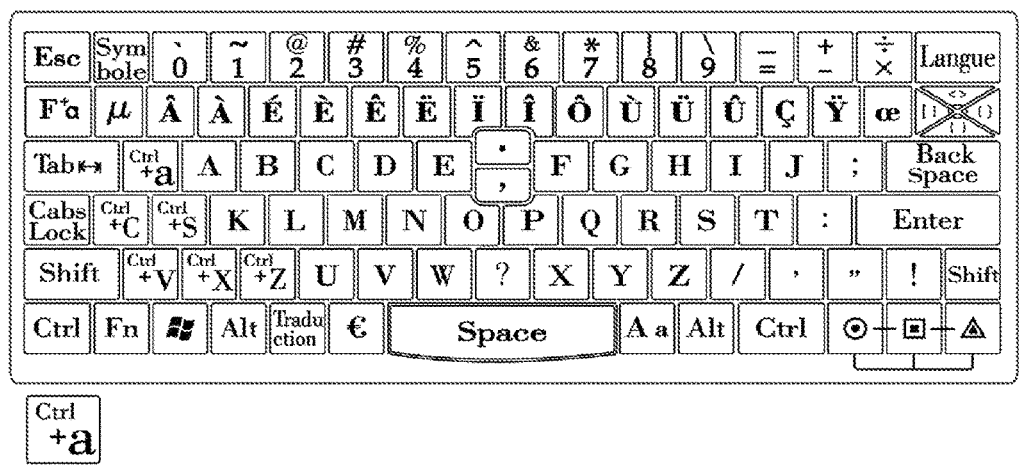
(2)
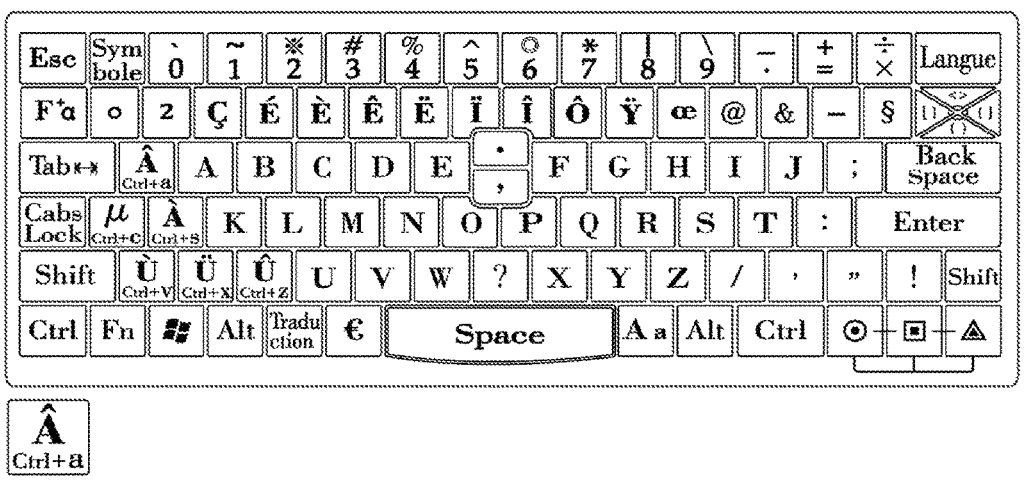

[FIG. 9B]
(1)
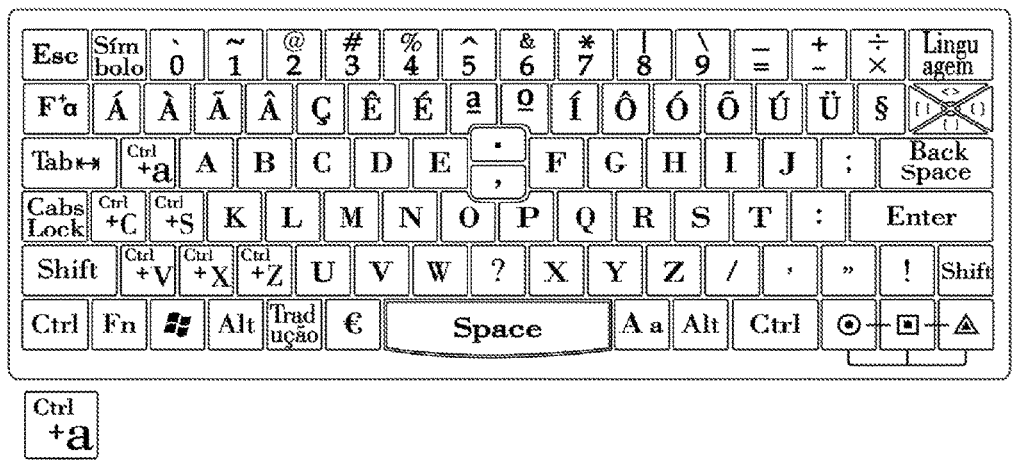
(2)
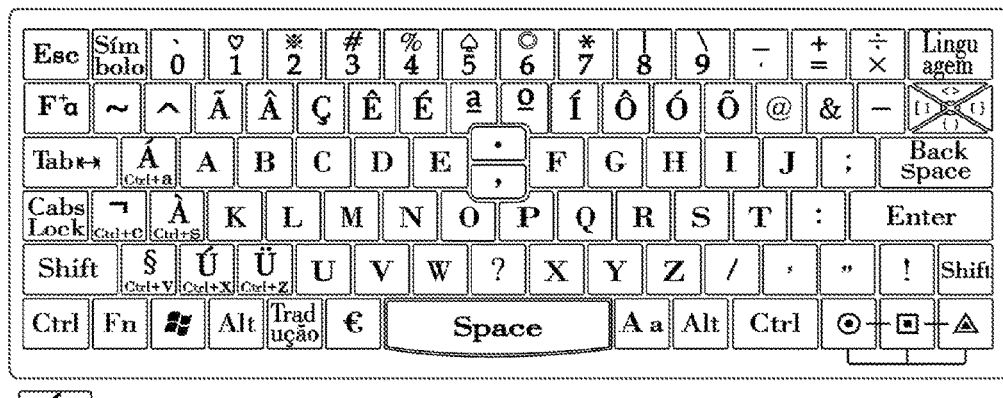

[FIG. 9C]
(1)
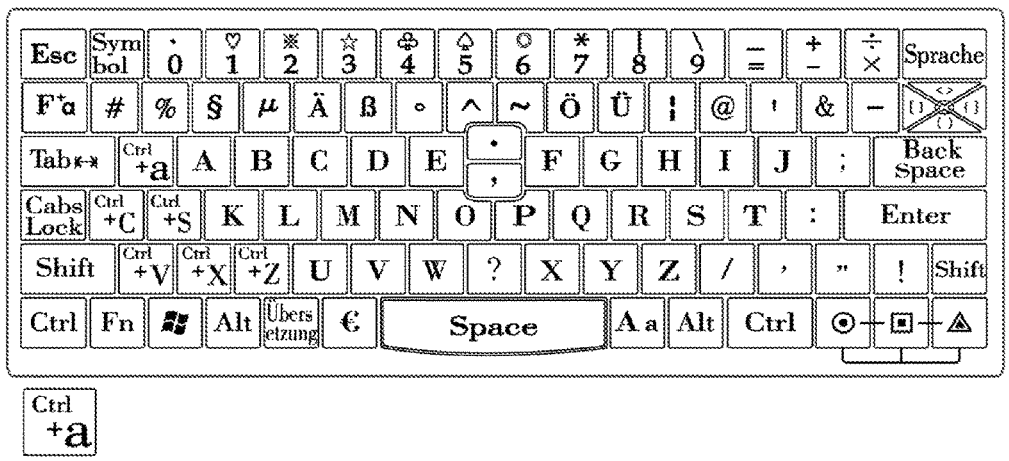
(2)
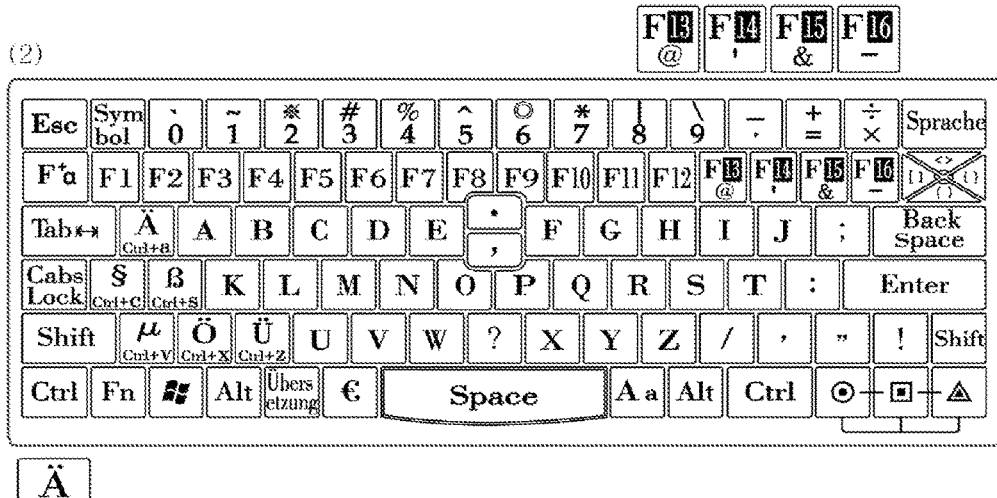

[FIG. 9D]
(1)
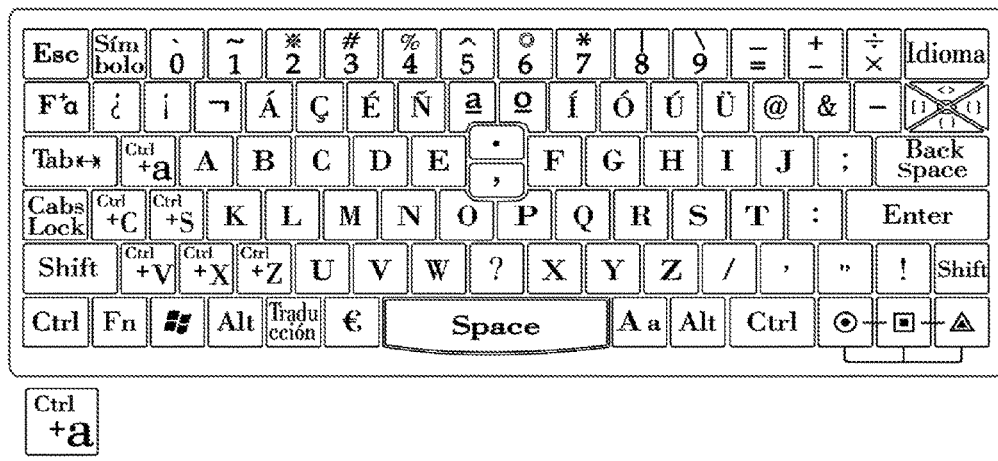
(2)
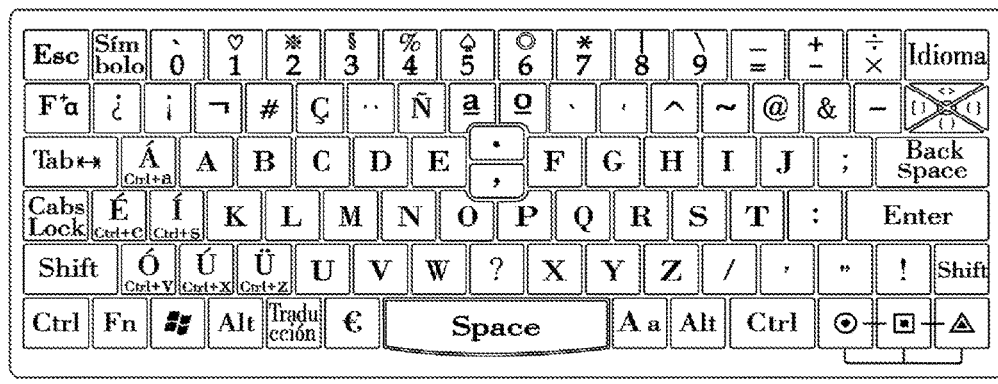

【FIG. 10A】
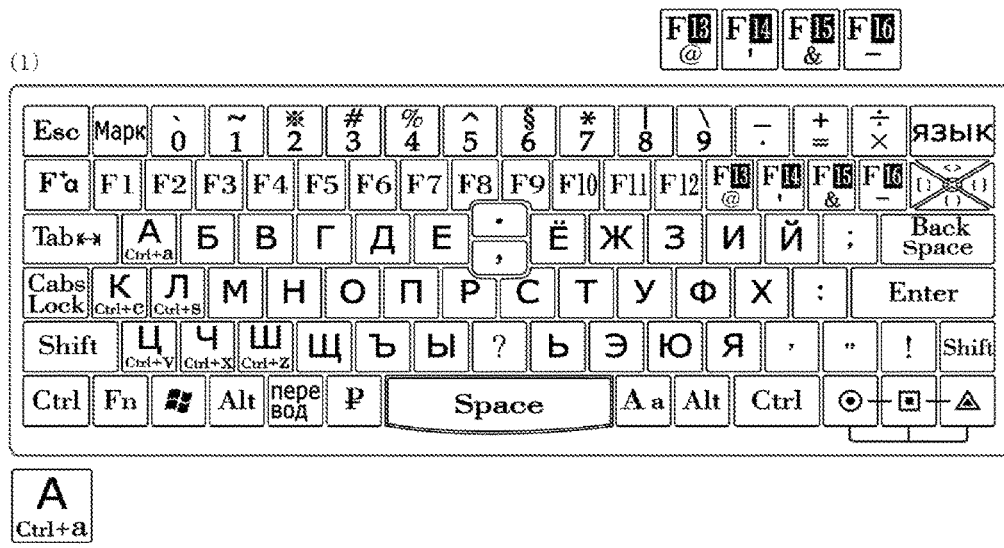
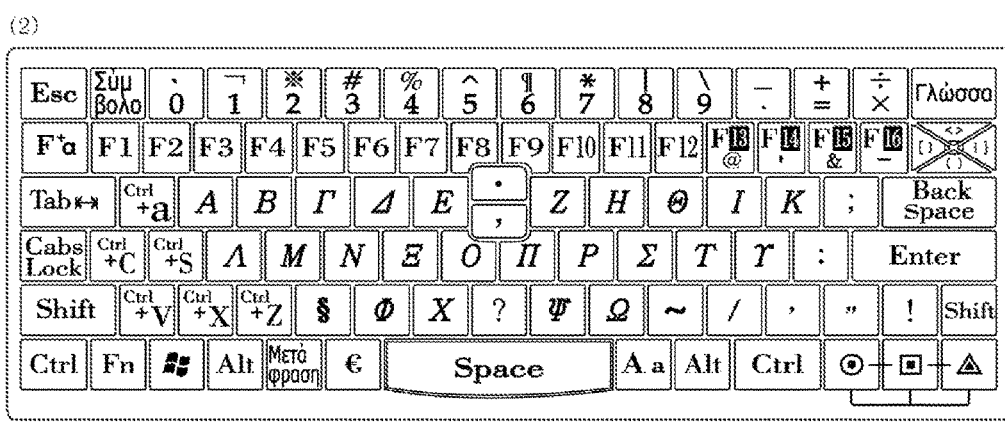

【FIG. 10B】
(1)
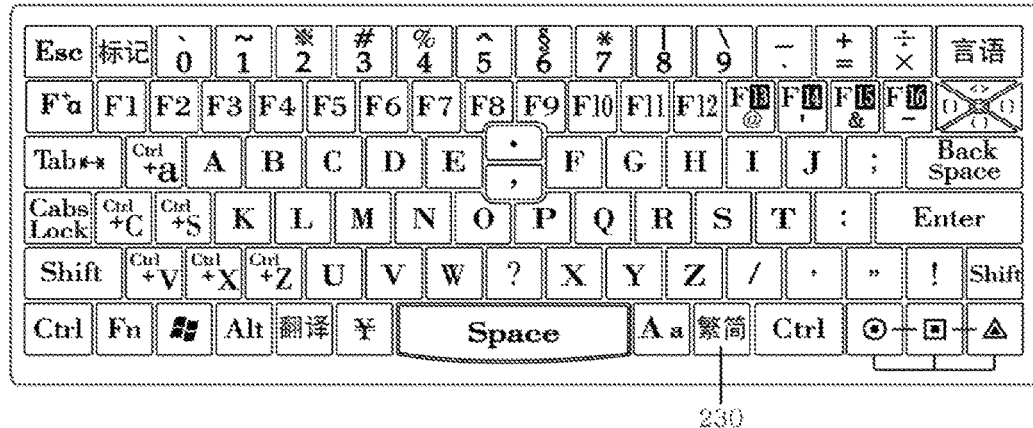
(2)
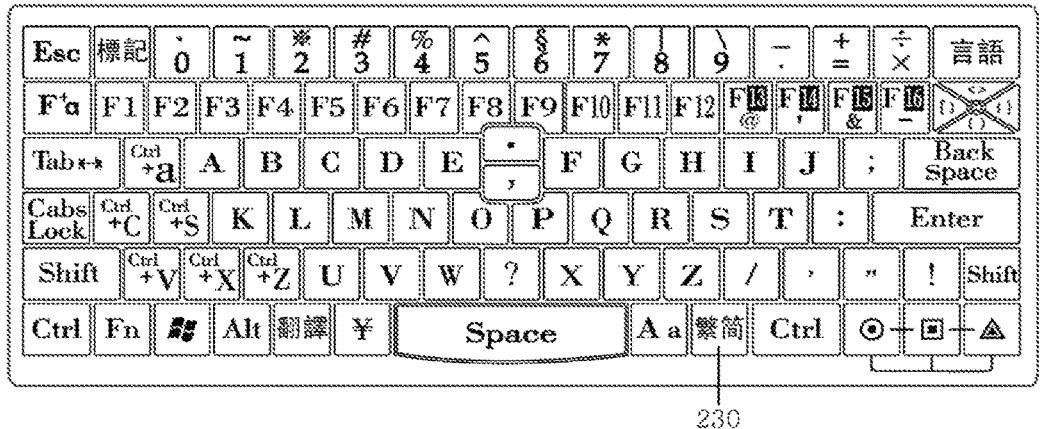
(3)
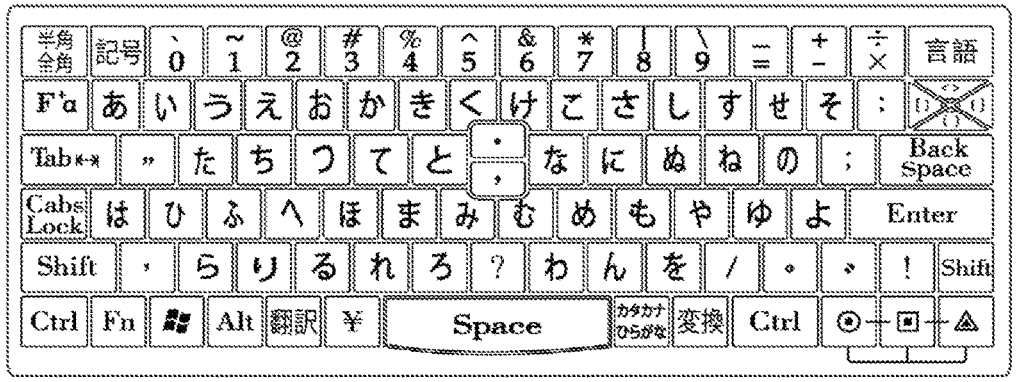

[FIG. 11]
(a)
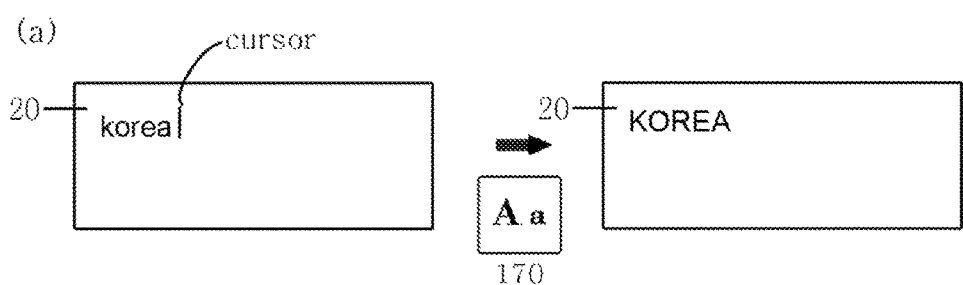
(b)
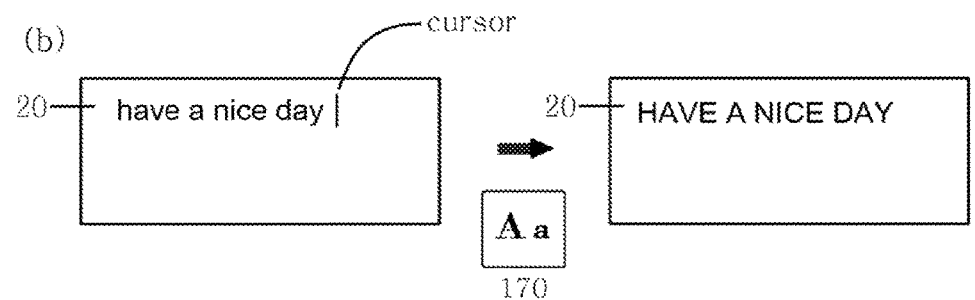

[FIG. 12]
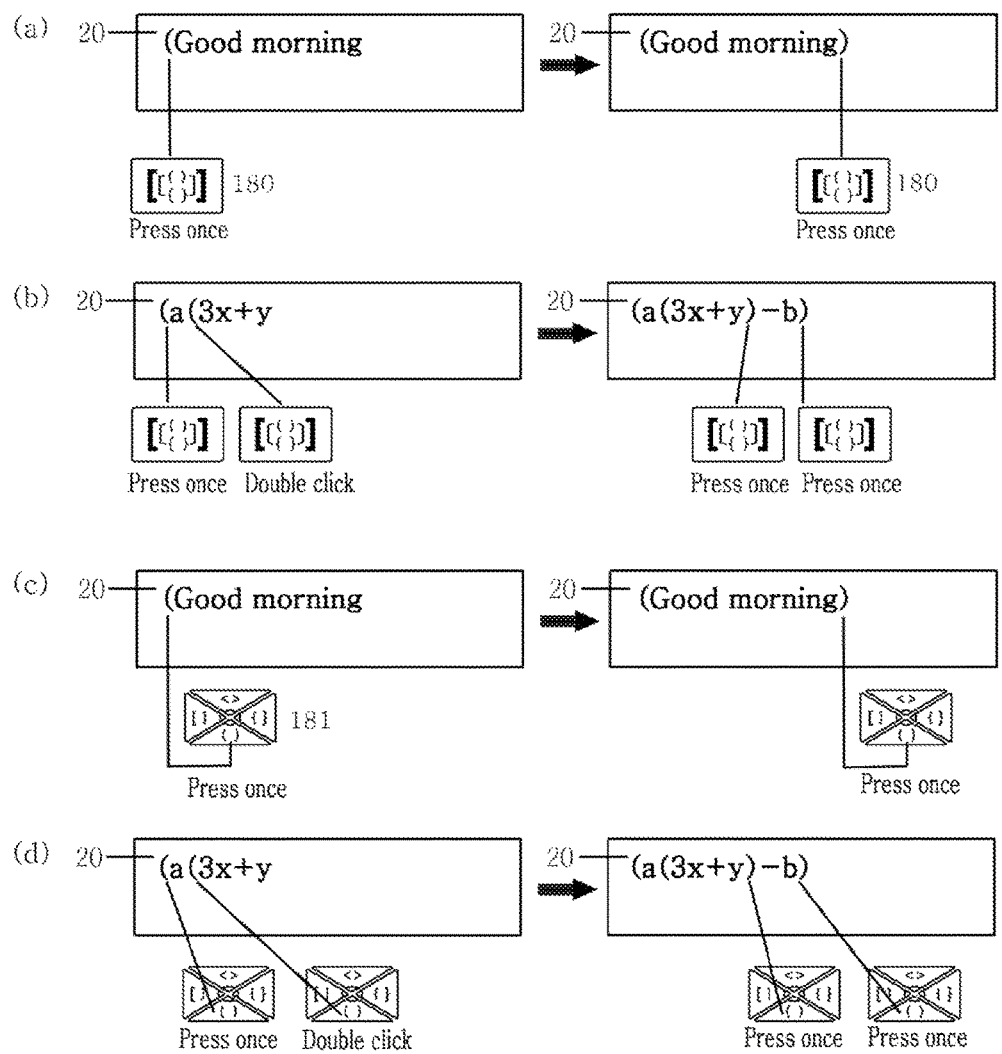

[FIG. 13]
(a)
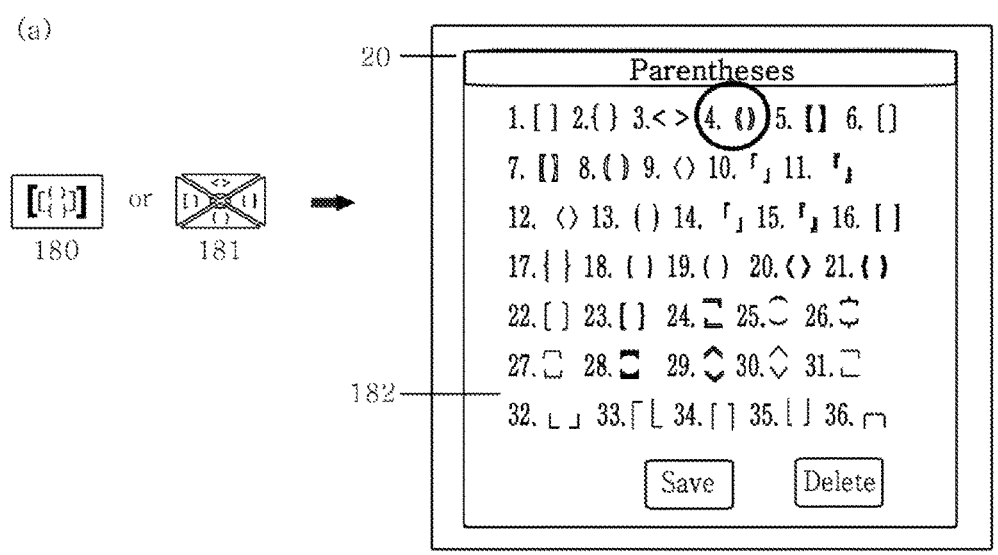
(b)
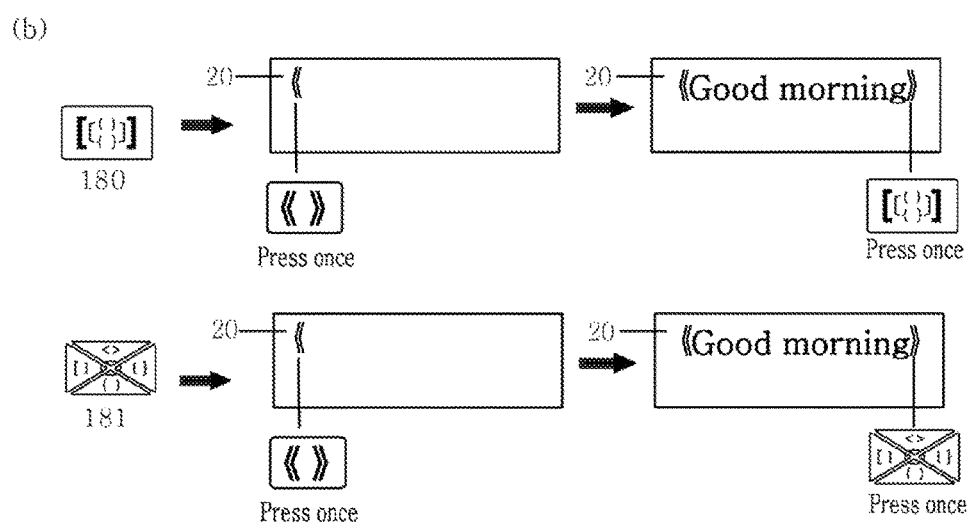

[FIG. 14]
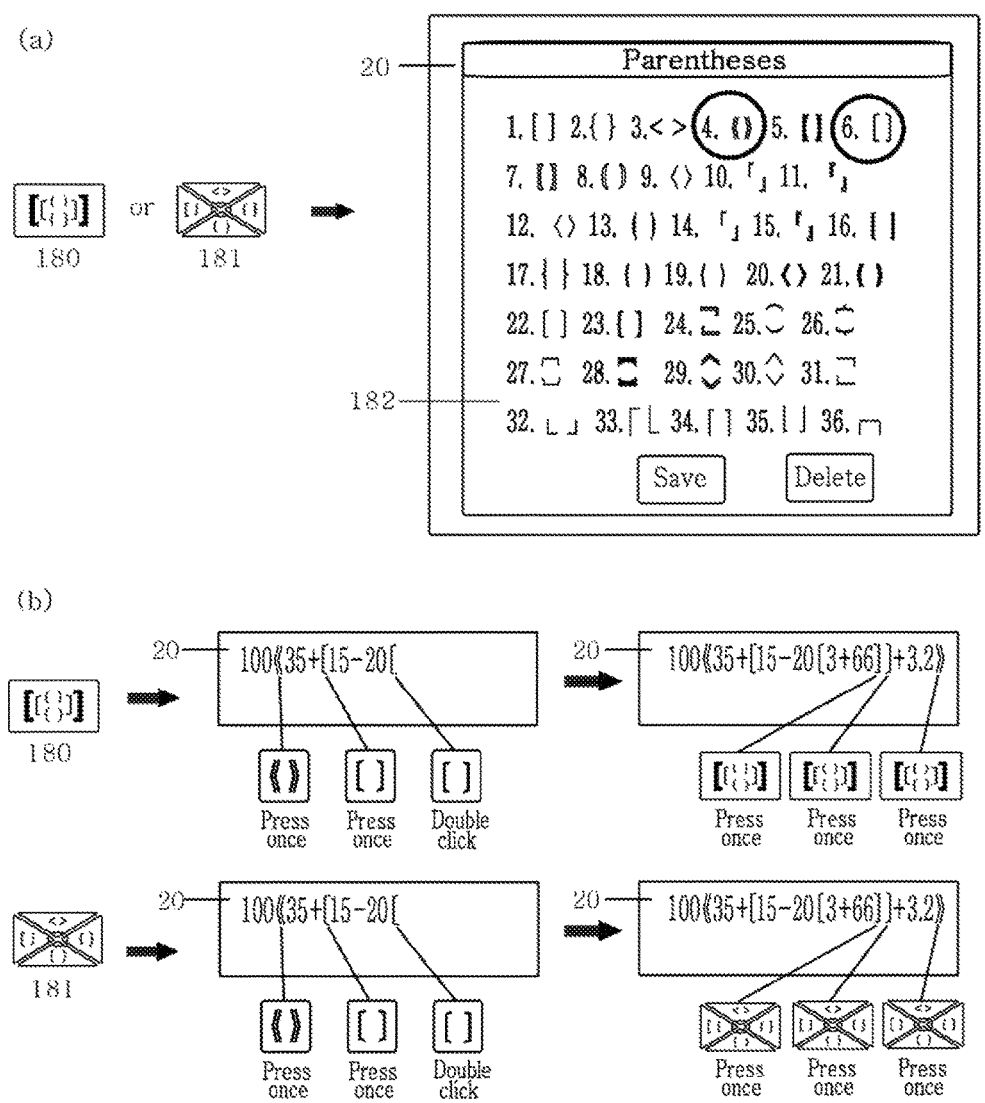

[FIG. 15]
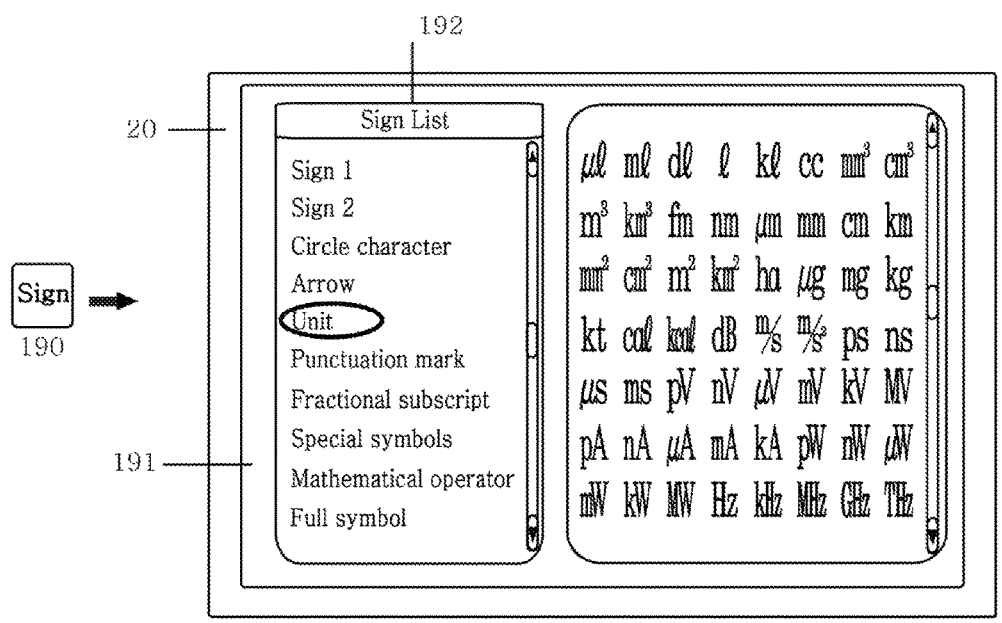

[FIG. 16]
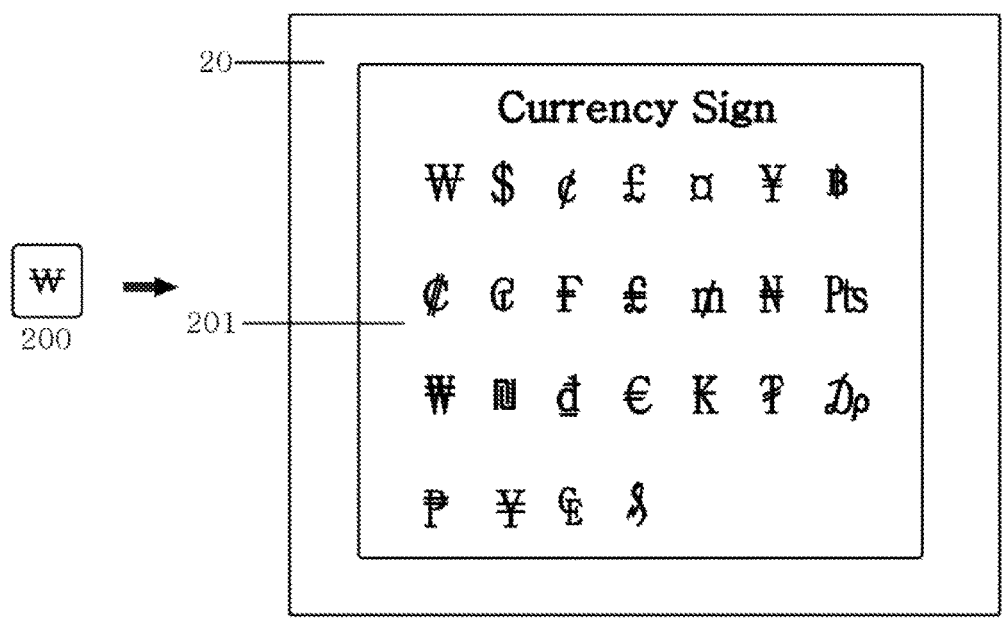

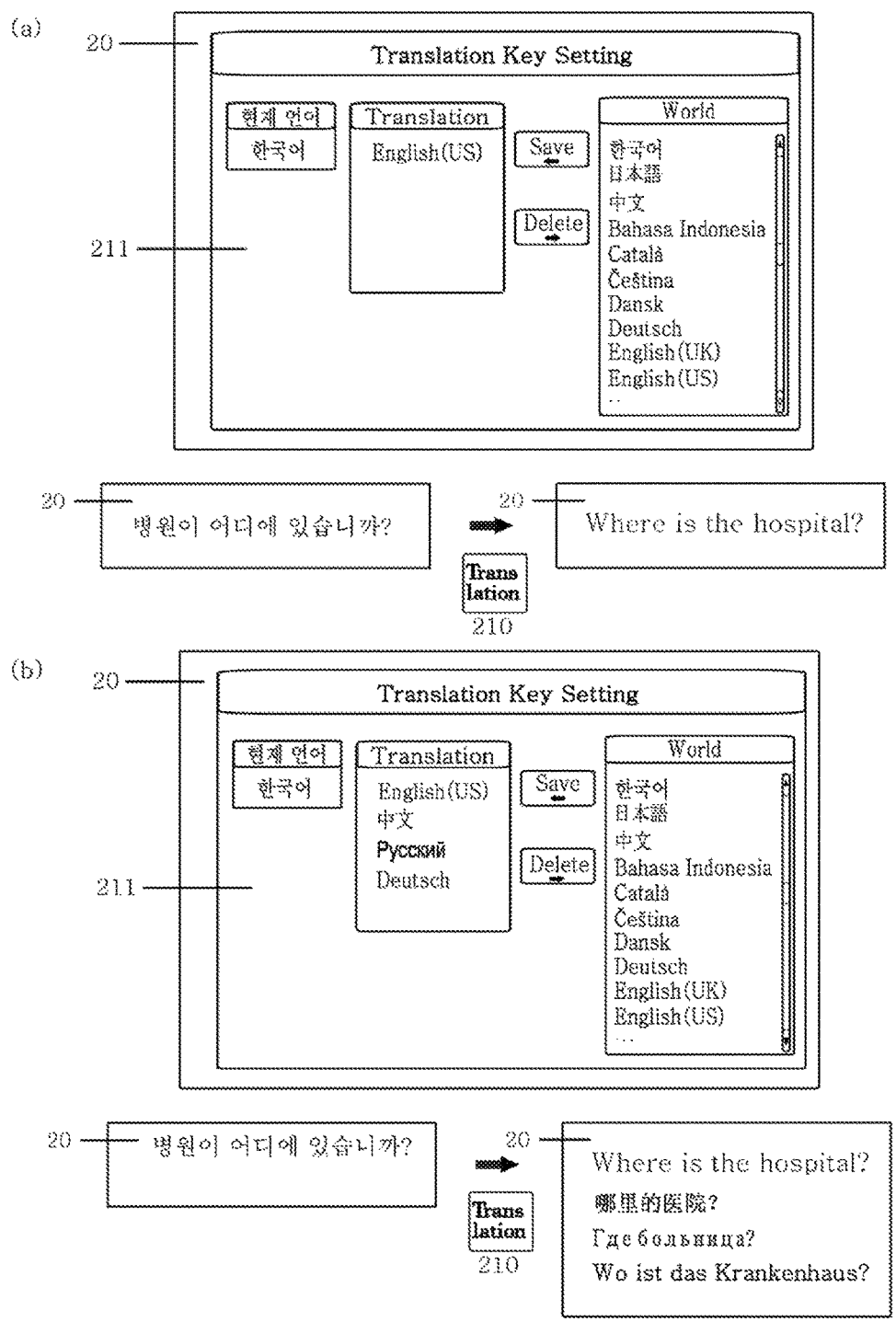
[FIG. 17]

【FIG. 18A】
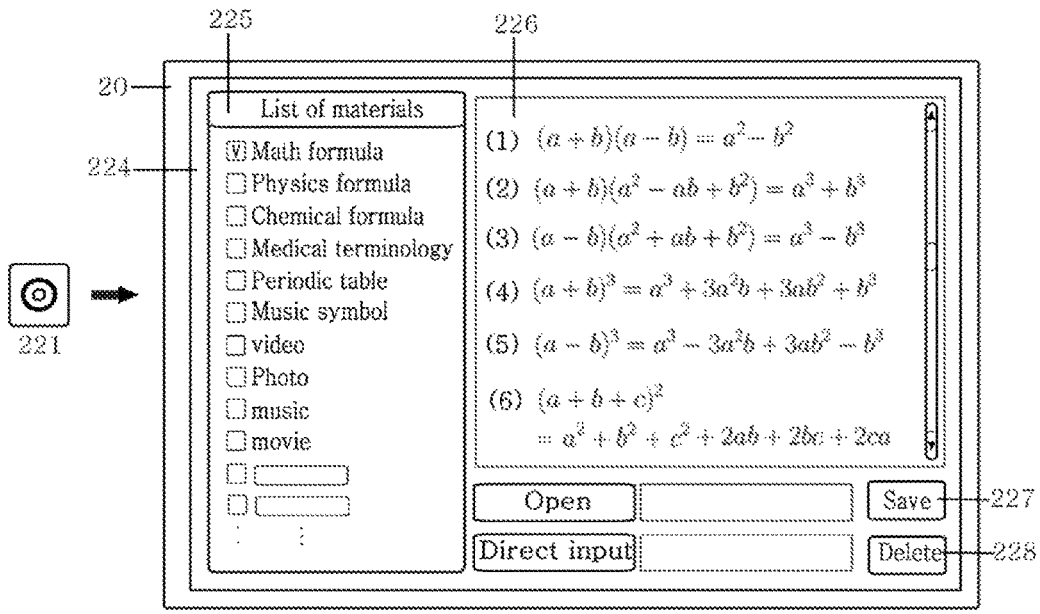
【FIG. 18B】
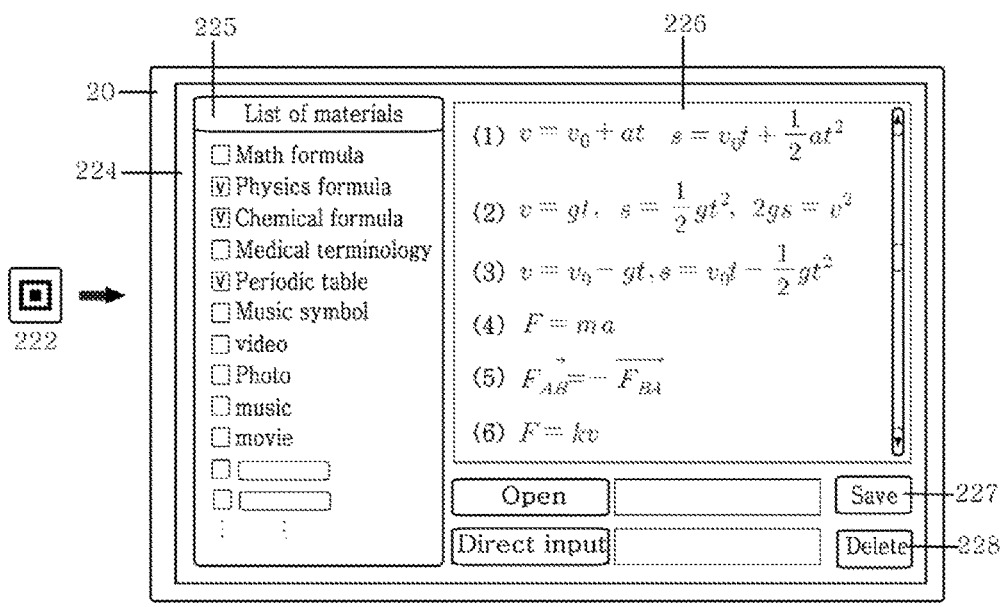

[FIG. 18C]
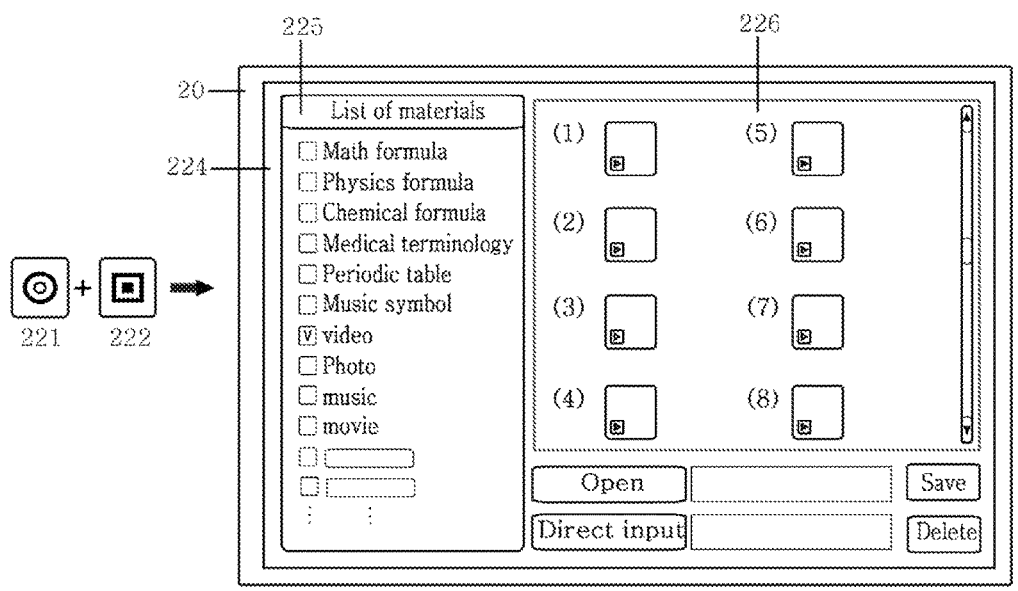
[FIG. 19]
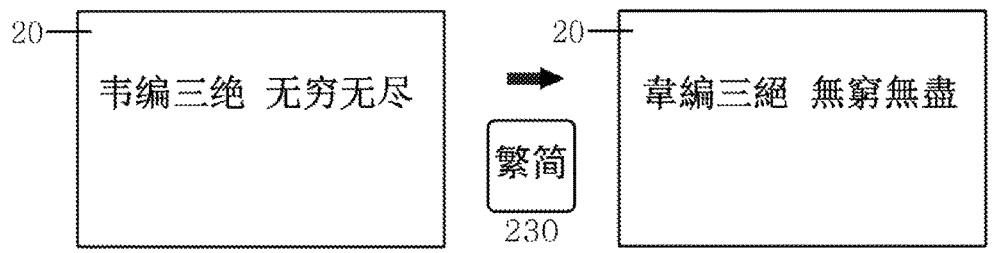

[FIG. 20]
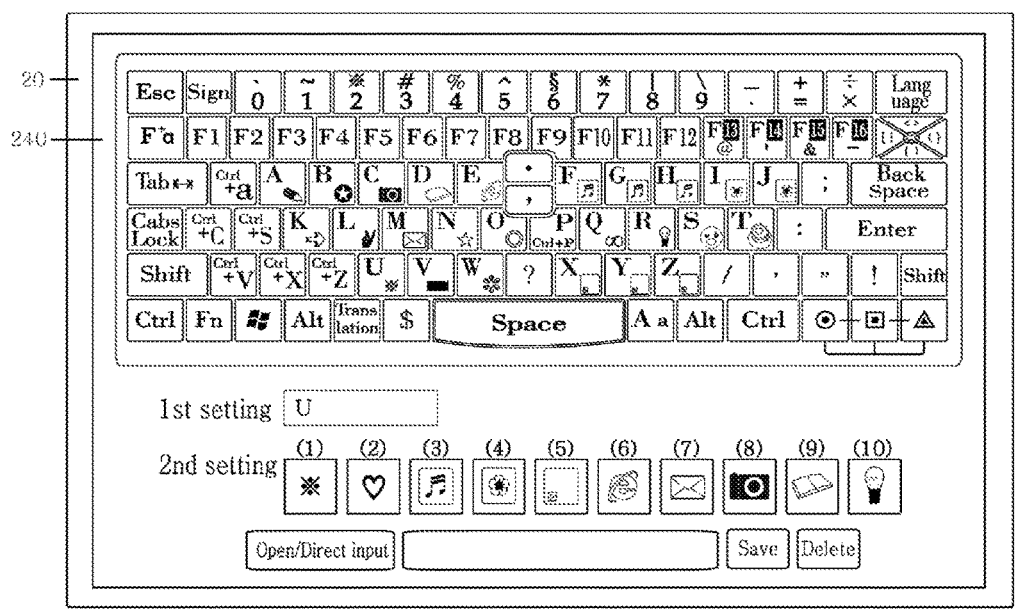

MULTILINGUAL CHARACTER INPUT DEVICE

TECHNICAL FIELD

The present invention relates to a multilingual character input device, and more particularly, to a character input device which enables inputting characters of each language in a convenient and efficient manner by converting a keyboard in terms of software to display all phonemes of respective languages.

BACKGROUND ART

In a related-art printed character input device, one or two languages are fixedly printed on a keyboard, and it is difficult to enter characters of a language which is not printed on the keyboard. In addition, in the related-art keyboard, all the basic characters and variant characters of each language may not be displayed on a keyboard and thus, in order to fully input characters of each language, basic characters, variant characters, and special characters which are not printed on the keyboard, need to be input using a push-switching function key such as a Shift or an Alt key, etc. Accordingly, there is a problem in that the flow of the input of characters is broken and typing errors occur, thereby lowering the speed and efficiency of inputting characters.

The technology of converting phonemes displayed on a button into an electronic display in addition to a fixed printing type keyboard to input multiple language is disclosed in Korean Utility Model Registration Nos. 20-0298234 and 20-0448924. In addition, a smart device in which a keyboard is generated on a touch display in terms of software and a character is input in a touch manner is commercially available.

However, as most of such keyboards employ the conventional QWERTY arrangement of the conventional manual typewriter, as shown in FIG. 1 below, which is neither relevant to the alphabetical order or the characteristics of phonemes nor shows regularity, and has a limited number of keys from 101 to 106, there is a limitation to display all languages around the world.

As shown in Table 1 below, the number of phonemes of Romanized languages is 26 to 46 which is obtained by adding the variant characters to 26 basic letters, while Cyrillic languages have 30 to 42 phonemes as shown in Table 2. Table 3 describes other languages including 24 to 76 phonemes.

As shown in FIG. 1 below, a related-art character button unit (E) includes 26 letter keys and 7 code keys, totaling 33 keys. Here, it is noticeable that the number of keys is not sufficient to display linguistic characters of each country.

Therefore, there is a need to rearrange the keyboard layout and provide scalability so as to be suitable for a digital era capable of implementing the keyboard layout of a manual typewriter in software.

TABLE 1

Romanized languages

| Language | Composition of phonemes | Total number of phonemes | Variant characters or special characters in addition to 26 basic letters |
|---|---|---|---|
| Dutch | 26 letters + 1 character | 27 | ij |
| Albanian | 26 letters + 2 characters | 28 | Ç, Ë |
| Norwegian | 26 letters + 3 characters | 29 | Æ, Ø, Å |
| Danish | 26 letters + 3 characters | 29 | Æ, Ø, Å |
| Swedish | 26 letters + 3 characters | 29 | Å, Ä, Ö |
| Finnish | 26 letters + 3 characters | 29 | Å, Ä, Ö |
| Vietnamese | 22 letters + 7 characters | 29 | Ă, Â, Đ, Ê, Ô, O', U' |
| Slovenian | 26 letters + 3 characters | 29 | Č, Š, Ž |
| German | 26 letters + 4 characters | 30 | Ä, Ö, Ü, ß |
| Romanian | 26 letters + 5 characters | 31 | Ă, Â, Î, Ş, Ţ |
| Serbian | 26 letters + 5 characters | 31 | Č, Ć, Đ, Š, Ž |
| Estonian | 26 letters + 6 characters | 32 | Š, Ž, Õ, Ä, Ö, Ü |
| Catalan | 26 letters + 6 characters | 32 | Ç, É, È, Ò, Ó, Ü |
| Italian | 26 letters + 7 characters | 33 | À, É, È, Ì, Ó, Ò, Ù |
| Azerbaijani | 26 letters + 7 characters | 33 | Ç, Ə, Ğ, İ, Ö, Ş, Ü |
| Latvian | 22 letters + 11 characters | 33 | Ā, Č, Ē, Ģ, Ī, Ķ, Ļ, Ņ, Š, Ū, Ž |
| Turkish | 26 letters + 8 characters | 34 | Â, Ç, Ğ, İ, Ö, Ş, Ü, Û |
| Polish | 26 letters + 9 characters | 35 | Ą, Ć, Ę, Ł, Ń, Ó, Ś, Ź, Ż |
| Hungarian | 26 letters + 9 characters | 35 | Á, É, Í, Ó, Ö, Ő, Ú, Ü, Ű |
| Lithuanian | 26 letters + 9 characters | 35 | Ą, Č, Ę, Ė, Į, Š, Ų, Ū, Ž |
| Icelandic | 26 letters + 10 characters | 36 | Á, Ð, É, Í, Ó, Ú, Ý, Þ, Æ, Ö |
| Spanish | 26 letters + 11 characters | 37 | Ñ, Á, É, Í, Ó, Ú, Ü, ch, ll, rr, Ç |
| Portuguese | 26 letters + 13 characters | 39 | Á, À, Â, Ã, É, Ê, Í, Ó, Ô, Õ, Ú, Ü, Ç |
| Brazil | 26 letters + 13 characters | 39 | Á, À, Â, Ã, É, Ê, Í, Ó, Ô, Õ, Ú, Ü, Ç |
| Czech | 26 letters + 15 characters | 41 | Á, Č, Ď, É, Ě, Í, Ň, Ó, Ř, Š, Ť, Ú, Ů, Ý, Ž |
| French | 26 letters + 15 characters | 41 | À, Â, É, È, Ê, Ë, Î, Ï, Ô, Ù, Û, Ü, Ÿ, Ç, œ |
| Slovak | 26 letters + 20 characters | 46 | Á, Ä, Č, Ď, Dz, Dž, É, Í, Ĺ, L', Ň, Ó, ch, Ô, Ŕ, Š, Ť, Ú, Ý, Ž |

TABLE 2

Cyrillic languages

| Language | Total number of phonemes |
|---|---|
| Bulgarian | 30 |
| Serbian | 30 |
| Macedonian | 31 |
| Russian | 33 |
| Ukrainian | 34 |
| Uzbekistan | 35 |
| Kyrgyzstan | 36 |

TABLE 2-continued

Cyrillic languages

| Language | Total number of phonemes |
|---|---|
| Turkmenistan | 38 |
| Kazakhstan | 42 |

TABLE 3

Other languages

| Language | Total number of phonemes |
|---|---|
| Greek | 24 |
| Cherokee | 24 |
| Swahili | 26 |
| Hebrew | 27 |
| Arabic | 28 |
| Persian | 32 |
| Myanmar | 33 |
| Amharic | 33 |
| Tibetan | 34 |
| Urdu | 38 |
| Armenian | 38 |
| Georgian | 39 |
| Georgian | 39 |
| Glagolitic | 41 |
| Thaana | 50 |
| Hindi | 51 |
| Lao | 62 |
| Thai | 76 |

DETAILED DESCRIPTION OF THE DISCLOSURE

Technical Object

To solve the aforementioned problems, the present invention is intended to provide a multilingual character input device which ensures convenient and efficient input for any language in the world through regularity and scalability in software.

Technical Solution

The multilingual character input device according to the embodiment to solve the technical problem includes a keyboard unit for displaying character phonemes converted from characters per language in a software-selected country on a key and selectively receiving the input of the displayed character phonemes; a display unit for displaying the received input character on a display; a storage unit for storing character phonemes, a list of data and a program; and, a control unit for controlling the keyboard unit, the display unit and the storage unit, wherein, the keyboard unit comprises: a numeric/symbol keys section for displaying numbers and symbols disposed at an upper part; an F keys section disposed below the numeric/symbol keys section for displaying functions, characters or preset functions and plurality of F keys are addible; a character keys section disposed below the F keys section for displaying basic phonemes of each language, and; a plurality of additional keys in the character keys section for displaying variant phonemes or preset symbols, wherein if language conversion is performed through a language conversion key of the keyboard unit, a language exceeding the phoneme number of the character keys section is assigned to the F keys section and the plurality of additional keys so as to display all character phonemes, so that the input of the characters for each language is received by one key stroke.

Advantageous Effects

The present invention enables to display both basic characters and variant characters for languages of each country on one keyboard, thus enabling rapid and complete input of characters of each language without converting by pressing the conventional Shift key or an Alt key, etc.

BRIEF DESCRIPTION OF DRAWINGS

FIG. 1 is an example of a related-art keyboard which is generally used.

FIG. 2 is a block diagram of a character input device according to an embodiment of this invention.

FIGS. 3A and 3B show a keyboard according to an embodiment of this invention.

FIG. 4A shows a keyboard for Korean version according to an embodiment of this invention.

FIG. 4B shows a keyboard for English version according to an embodiment of this invention.

FIG. 4C shows a keyboard for Korean-English version according to an embodiment of this invention.

FIG. 5 shows the language conversion key and language list display according to an embodiment of this invention.

FIG. 6A shows the number of times the F+α key is pressed and a corresponding example of setting F keys on the F key settings display according to an embodiment of this invention.

FIG. 6B shows an example of when an F key is activated according to the number of times the F+α key is pressed according to an embodiment of this invention.

FIG. 7A shows U keys section setting display according to an embodiment of this invention.

FIGS. 7B and 7C show a method to input a number and symbol on the numeric/symbol keys section according to an embodiment of this invention.

FIG. 8 shows a keyboard for Korean (Hunminjeongum) according to an embodiment of this invention.

FIGS. 9A to 9D show a keyboard for each Romanized language according to an embodiment of this invention.

FIGS. 10A and 10B show a keyboard for each non-Romanized language according to an embodiment of this invention.

FIG. 11 shows an example of using the upper/lower case shift key on a keyboard according to an embodiment of this invention.

FIGS. 12A and 12B show examples of a parenthesis symbol being input when the integrated parenthesis key 1 is pressed on the keyboard according to an embodiment of this invention.

FIGS. 12C and 12D show examples of a parenthesis symbol being input when the integrated parenthesis key 2 is pressed on the keyboard according to an embodiment of this invention.

FIGS. 13A and 13B show examples of one or more parenthesis symbols being input when the integrated parenthesis key 1 or 2 is pressed on the keyboard according to an embodiment of this invention.

FIGS. 14A and 14B show examples of entering various parenthesis symbols consecutively by the integrated parenthesis key 1 or the integrated parenthesis key 2 on a keyboard according to an embodiment of this invention.

FIG. 15 shows examples of the display unit displaying the symbol display when the integrated symbol key is pressed on a keyboard according to an embodiment of this invention.

FIG. 16 shows the currency unit display on a keyboard according to an embodiment of this invention.

FIGS. 17A and 17B show the translation key setting display and an example of completed translation when the translation key is pressed according to an embodiment of this invention.

FIG. 18A shows the data display on the display unit to register and delete data to the circle symbol (○) key among the Won-Bang-Gak (○□△) keys on a keyboard according to an embodiment of this invention.

FIG. 18B shows the data display on the display unit when the square symbol (□) key among the Won-Bang-Gak (○□△) keys is pressed on a keyboard according to an embodiment of this invention.

FIG. 18C shows the data display on the display unit when the circle symbol (○) key and the square symbol (□) key are pressed simultaneously among the Won-Bang-Gak (○□△) keys on a keyboard according to an embodiment of this invention.

FIG. 19 shows traditional-simplified Chinese shift key on a keyboard for inputting Chinese according to an embodiment of this invention.

FIG. 20 shows an example of presetting a keyboard according to an embodiment of this invention.

MODES FOR EMBODYING THE INVENTION

Hereinbelow, an exemplary embodiment of the present invention will be described with reference to the accompanying drawings and contents of the accompanying drawings.

FIG. 2 shows a block diagram of a multilingual character input device according to this invention, which includes a keyboard unit 10 for converting characters to character phonemes by software-selected languages, displaying the character phonemes on keys, and selectively receiving the input of the displayed character phonemes, a display unit 20 for displaying the received input character on a display, a storage unit 30 for storing program and a data, and a control unit 40 for controlling the keyboard unit, the storage unit and the display unit.

In the present invention, the word 'software' means that it is programmed so that the character phonemes of each language can be displayed corresponding to the individual keys of the keyboard, and then it is displayed on the corresponding key in response to the command from the control unit by the operation of the conversion key, or means a preset function that can edit a list or a function such as register or delete, etc.

FIGS. 3A and 3B show the keyboard unit 10 according to this invention and correspond to the left section (A) of FIG. 1. The keyboard unit includes a numeric/symbol keys section 110, F keys section 120, U keys section 123, character keys section 130, and functional keys section 140. The character keys section 130 may include an additional keys section 131.

Keys in this invention may be partitioned areas on the touch display or buttons with a liquid crystal display (LCD), a light emitting diode (LED), an organic LED (OLED) or optical fiber to display character phonemes.

The features of the present invention which make the present invention distinctive over the related-art keyboard layout are that the F keys section 120 which is located between the character keys section 130 and the numeric/symbol keys section 110, and the additional keys section 131 composed of multiple additional keys is located within the character keys section 130. Such layout enables the display of all character phonemes of any language by adding characters or functions to the F keys section or additional keys section as each of languages has a different number of phonemes.

Therefore, according to this invention, as all characters of a selected language are displayed on the keyboard unit, it is possible to enter any character of the selected language quickly with a single keystroke without using an additional function key such as Shift key or Alt key, etc. In this invention, function keys such as Shift key or Alt key, etc. may be used for entering symbols or functions other than characters.

The multilingual character input device in this invention is referred to as CEI (Convenient keyboard to express an idea and information diversely and freely).

FIG. 4A shows examples of a keyboard for Korean version 100 according to an embodiment 1 of this invention. FIG. 4B shows examples of a keyboard for English version 101 according to an embodiment 2 of this invention. FIG. 4C shows examples of a keyboard for Korean-English version 102 according to an embodiment 3 of this invention.

Another feature of this invention relates to a function to preset the conversion keys or the function keys. FIG. 5 shows the language conversion key 150 and the language list display according to an embodiment of this invention. The language list display 151 is displayed on the display unit 20 when the language conversion key is pressed and held for over 0.2 seconds or pressed repeatedly (e.g., a double click, etc.). The language list display may include a user-defined language list 152 and a worldwide language list 153.

Languages may be registered in the user-defined language list by the manufacturer at the time of production or the user can register or delete a desired language directly in the list. Language is registered in the user-defined language list, when a desired language in the worldwide language list is selected and the Register (Save) button 154 is pressed. Language is deleted from the user-defined language list, when a desired language to delete in the user-defined list is selected and the Delete button 155 is pressed. Preset function enables quick and easy conversion to a preset language to be displayed on the keyboard unit without searching the language one by one in the worldwide language list.

When a language is selected among the languages in the user-defined language list, the character phonemes of the selected languages are displayed on the keyboard unit. In addition, one or more languages may be selected for activation on the keyboard unit among the languages registered in the user-defined language list. In this case, each time the language conversion key is pressed, the characters (language phonemes) corresponding to the selected languages are converted in predetermined order and displayed on the keyboard unit.

Referring to FIG. 5, Korean, English, Chinese and German are selected among the languages registered in the user-defined language list. In this case, the language displayed on the keyboard unit is Korean. And when the language conversion key is pressed once, English will be displayed on the keyboard unit. And when the language conversion key is pressed once again, Chinese will be displayed on the keyboard unit. And when the language conversion key is pressed once again, German will be displayed on the keyboard unit. And when the language conversion key is pressed once again, Korean will be displayed on the keyboard unit again.

Korean and English can be displayed on the keyboard unit simultaneously as shown in FIG. 4C when Korean-English is selected in the user-defined language list in FIG. 5. This shows an example of a keyboard layout that can converted and input between 2 languages, Korean and English as in the conventional keyboard.

This invention features a preset function to increase or decrease the number of F keys or additional keys. It is desirable to set the number of keys of the additional keys section 131 and the F keys section 120 enough for integrally inputting the languages of the world. In an embodiment of this invention, a keyboard layout is presented to which 6 additional keys and 4 more F keys from F13 to F16 are added along with the existing F keys from F1 through F12. F keys from F1 through F12 may feature the same function as the original function, and additional F keys from F13 to F16 can be used by adding new functions. The number of additional keys and F keys may be increased or decreased depending on the situation and use, and the position in which the keys are arranged can also be changed.

F keys section includes the F+α key 121 and multiple F keys. When F+α key is not activated as the F+α key is not pressed, F keys display original set functions. In addition, it is possible to convert sequentially the characters or functions displayed on the multiple F keys by pressing the F+α key. For example, when the F+α key is pressed once, variant characters, special characters or symbols of a displayed language on the keys section may be displayed on the F keys, when the F+α key is pressed twice, the secondary functions may be displayed on the F keys, and when the F+α key is pressed three times, another variant characters, special characters or symbols may be displayed to be inputted on the F keys.

The F key setting display 122 is displayed on the display unit when the F+α key is pressed and held down for over 0.2 seconds. On the F key setting display, it is possible to increase or decrease the number of times to press the F+α key. On the F key setting display, it is possible to register or delete which character or function is displayed on each of the F keys according to the number of times the F+α key is pressed. On the F key setting display, data can be registered when a position to be registered in each key is selected and the data stored in the storage unit is imported, or when inputted directly by user.

FIG. 6A shows the number of times the F+α key is pressed and a corresponding example of setting F keys on the F key settings display according to an embodiment of this invention.

In addition, it is possible to add one or more F keys to the F keys section. It is also possible to assign a character or function to an F key added. For example, it is possible to use it as a shortcut key for a frequently used function such as translation, dictionary, taking photo or video recording etc. Alternatively, it is possible to link the added F key directly to a symbol, user-registered boilerplate, emoticon, emoji, character image, photo or memo. It is also possible to link it to a desired function such as saving files and organize it to a user folder.

Also, when the order of pressing the F+α key is determined on the F key settings display, the F keys section is activated in predetermined order, and the F key section which the order of pressing the F+α key is not determined is deactivated and is not displayed.

FIG. 6B shows an example of F keys is activated according to the number of times the F+α key is pressed. If the user designates the number of times to press the F+α key as shown in FIG. 6B, more specifically, 0 time to the 1st line, 2 times to the 3rd line, and 1 time to the 4th line, F keys of the 1st line will be displayed on the F keys and operated as an original function key, when the F+α key is not pressed, or F keys of the 4th line will be activated and displayed on the F keys when the F+α key is pressed once, and F keys of the 3rd line will be activated and displayed when the F+α key is pressed twice. In this case, as no numeric value is assigned to the 2nd line of the F+α key, F keys of the 2nd line are deactivated and are not displayed on the F keys while converting the F keys by pressing the F+α key.

As it is possible to convert the characters or functions displayed on the F keys section by pressing the F+α key as consecutively as desired, the user can input various characters and use various functions with a single keyboard. Therefore, the keyboard of this invention may be used as a user-oriented one which is optimized for the needs of each user.

It is also possible to designate basic characters, variant characters or special characters of a selected language preferentially to the additional keys section (131) depicted in FIG. 3. If spare additional keys are available even after designating the aforementioned characters to the additional keys, it is possible to designate required things which is need for inputting characters such as characters, symbols, pictures, photos or other functions necessary for creating a document to such spare keys.

It is possible to designate any one of the edit functions such as Select All, Copy, Save, Paste, Cut or Undo to any of the aforementioned multiple additional keys to bring an assigned function by pressing the corresponding additional key without pressing the Ctrl key. For example, many people use shortcut keys in combination of the Ctrl key on the keyboard to use edit functions such as Select All, Copy, Save, Paste, Cut and Undo, etc. Pressing the Ctrl key and the A key together activates the Select All function when editing document. Similarly, the combination of Ctrl+C activates the function of Copy, Ctrl+S activates the function of Save, Ctrl+V activates the function of Paste, Ctrl+X activates the function of Cut and Ctrl+z activates the function of Undo.

In this invention, it is possible to activate a required edit function with a single keystroke of an additional key without pressing the Ctrl key together by designating one of the edit functions to each of the additional key. FIG. 4B shows a layout of additional keys to which edit functions are assigned according to an embodiment of this invention. For example, an additional key for Ctrl+a (132) can activate the Select All function, Ctrl+C (133) can activate the Copy function, Ctrl+S (134) can activate the Save function, Ctrl+V (135) can activate the Paste function, Ctrl+X (136) can activate the Cut function, and Ctrl+Z (137) can activate the Undo function. Activating an edit function without pressing the Ctrl key may be assigned not only to any of the aforementioned additional keys but to any key of the keyboard unit as appropriate.

Besides, another function may be executed when the additional key or any key performing an edit function is pressed and held down for over 0.2 seconds.

If a character or symbol is assigned to a key that activates one of the edit functions directly without the combination of the Ctrl key depicted in FIG. 4A, the assigned character or symbol is inputted when the key is pressed once and the assigned edit function is executed directly when the key is pressed and held down for over 0.2 seconds without Ctrl key is pressed.

One of the other features of this invention is to assign user-defined keys 123 (hereinafter referred to as U keys) in addition to fixed character keys or function keys. As shown in FIG. 3, added F keys in the F keys section and multiple keys in the numeric/symbol keys section to which no number is assigned are referred to as U keys section 123. Data may be registered to the U keys section as the user desires and these data may be changed or modified. The aforementioned data includes everything that the user wants to input through keyboard, including characters, symbols, marks, photos, boilerplates, formula, emoticons, or image characters etc.

FIG. 7A shows the U keys section setting display according to an embodiment of this invention. Referring to FIG. 7A, the four additional F keys from F13 to F16 are added to the F keys section and 3 keys which are (-,.), (+,=), (÷,×) and to which no number is assigned are added to the numeric/symbol keys section. The user can preset frequently used data according to the professional job or function to use them whenever they are needed rather than fixing specific symbols to the U keys section, and such settings may be changed and modified as desired. Therefore, this invention ensures a user-oriented and optimized keyboard.

To register data in the U keys section, press any two keys in the U keys section simultaneously and then the U keys section setting display 124 will be displayed on the display unit, on which the user can register or delete a multiple number of data in or from each of the U keys. On the U keys setting display, data can be registered when a position to be registered in each key is selected and the data stored in the storage unit is imported, or when inputted directly by user. Although it is desirable to register 10 to 20 data in each key, over 20 data may be registered.

In addition, data is displayed on the U keys section when one of the U keys section is pressed and held down for over 0.2 seconds, and a plurality of pre-registered data are converted and displayed on each key in predetermined order at a predetermined time interval until when pressed key is released, and when pressed key is released, corresponding data is displayed on each key. The aforementioned predetermined time interval could be 0.3 to 1 second, desirably.

In the aforementioned U keys section, a multiple number of keys in the numeric/symbol keys section to which no number is assigned may be operated as a part of U keys section even when the F+α key is activated. Besides, a data may be registered in each of the keys in the numeric/symbol keys section to which no number is assigned, or two data may be registered top and bottom of each of the aforementioned key. If two data are to be registered in the top and bottom of a single key, the data to be assigned to the top may be input by pressing the Shift key. The same data may be pre-registered in all the U keys or more data or different data may be registered to each of the keys as desired.

As an embodiment of this invention, symbols displayed on the entire numeric/symbol keys of the numeric/symbol keys section are converted to numbers, or numbers displayed on the entire numeric/symbol keys of the numeric/symbol keys section are converted to symbols, when any of the keys among the numeric/symbol keys section which contains 10 numeric/symbol keys numbers from 0 to 9 and symbols placed top and bottom is pressed and held down for over 0.2 seconds. In this format, the user can input a number or a symbol with a single keystroke without pressing the Shift or Alt key, etc. according to the intent of this invention.

As shown in (1) of FIG. 7B, a number from 0 to 9 is located at the bottom and a symbol is located at the top for the numeric/symbol keys section, the numbers can be directly inputted when corresponding key is pressed, and the symbols can be inputted when Shift key which is push-switching function key is pressed. The positions of the number and the symbol on a key will be switched across 10 numeric/symbol keys as shown in (2) of FIG. 7B, in which the numeric value is located at the top and the symbol is located at the bottom when any of 10 numeric/symbol keys is pressed and held down for over 0.2 seconds. Then, the user can input a symbol with a single keystroke without pressing the Shift or Alt key, etc.

Even in the case that characters are assigned to the numeric/symbol keys depending on the language, positions of number, symbol or character is switched when any of the numeric/symbol section is pressed and held down for over 0.2 seconds, and the user can input a number, symbol or character with a single keystroke without pressing the Shift or Alt key, etc.

This function can also be applied to a keyboard layout in which numbers, symbols or characters are fixedly printed on the numeric/symbol keys section. For example, even if a symbol or character is fixedly printed on each key of upper part of the numeric/symbol keys section and a number is fixedly printed on each key of lower part of the numeric/symbol keys section, if any key of 10 numeric/symbol keys is pressed and held down for over 0.2 seconds, the positions of the number and symbol will be switched internally to let the user input a desired symbol directly without pressing the Shift key or Alt key, etc. And number can be inputted with a single stroke when any key of 10 numeric/symbol keys is pressed and held down for over 0.2 seconds again.

In addition, it is possible to designate a numeric/symbol conversion key 125 in addition in the numeric/symbol keys section to enable to enter a number, symbol or character without pressing the function key such as Shift or Alt key, etc. As shown in (1) of FIG. 7C, when the numeric/symbol conversion key is not pressed, a symbol or character is disposed at the upper part and a number is disposed at the lower part of the 10 numeric/symbol keys, and a number is inputted directly with a single stroke, and symbol or character is inputted with pressing Shift key together.

As shown in (2) of FIG. 7C, when the numeric/symbol conversion key is pressed once, the positions of number, symbol or character are switched each other, so the number is disposed at the upper part and the symbol or character is disposed at the lower part, and the symbol or character is inputted directly with a single stroke without pressing the function key such as Shift or Alt key, etc. together.

The keyboard for Korean according to an embodiment of this invention has a layout for keys consisting of 19 Korean consonants which are 'ㄱ,ㄴ,ㄷ,ㄹ,ㅁ,ㅂ,ㅅ,ㅇ,ㅈ,ㅊ,ㅋ,ㅌ,ㅍ,ㅎ,ㄲ,ㄸ,ㅃ,ㅆ,ㅉ' and 14 Korean vowels which are 'ㅏ,ㅑ,ㅓ,ㅕ,ㅗ,ㅛ,ㅜ,ㅠ,ㅡ,ㅣ,ㅐ,ㅒ,ㅔ,ㅖ'. This layout is designed in consideration of the order of consonants and vowels, their resemblance, and frequency of use to let anyone understand the key locations of consonants and vowels in Hangul intuitively without memorizing the keyboard and enable user to input characters efficiently. In addition, as Korean double consonants such as 'ㄲ,ㄸ,ㅃ,ㅆ,ㅉ' and Korean complex vowel such as 'ㅐ,ㅔ' are laid out separately on the keyboard, the user can enter those keys directly without pressing the Shift key or other function key together.

It is desirable to lay out 'ㅆ, ㅅ, ㅇ, ㅁ, ㄷ, ㄱ' on the left part of the 1st line, 'ㅏ,ㅑ,ㅓ,ㅕ' on the right part of the 1st line, 'ㅉ,ㅊ,ㅈ,ㅎ,ㅂ,ㄹ,ㄴ' on the left part of the 2nd line, 'ㅡ,ㅣ,ㅗ,ㅜ,ㅔ' on the right part of the 2nd line, 'ㄲ,ㅋ,ㅍ,ㅃ,ㄸ,ㅌ' on the left part of the 3rd line, and 'ㅐ,ㅒ,ㅛ,ㅠ,ㅖ' on the right part of the 3rd line of the character keys section. Besides, the aforementioned keyboard unit has a total of 33 keys comprising 19 Korean consonants and 14 Korean vowels, and their layout may be modified as the user desires.

FIG. 8 shows a keyboard layout for Korean (Hunminjeongum) version 103 according to this invention. A total of 33 characters including 19 consonants and 14 vowels of Hangul are displayed on the character keys section, and archaic Hangul characters including 4 Hunminjeougeum characters of ·ㆆ ㆄ ㆍ ㅿ· are displayed on the F keys section, when the language conversion key is pressed and 'Hangul (Hunminjeongum)' is selected. The archaic Hangul character is converted and displayed on the F keys section in predetermined order when the F+α key is pressed, so that all Korean characters could be inputted in an efficient way.

It is a sad reality that there is no language currently that can express 100% of all the languages and sounds of all over the world. The present 'Modern Hangul' can't distinguish and express such English sounds as [f], [v], [θ], [ð], [z], [ʃ], [ʒ], [ʤ], [ʧ], [r] and [l] precisely when spelling English, etc. However, if the 4 characters ·ㆆ ㆄ ㆍ ㅿ· of Hunminjeougeum and all the archaic characters of Hangul are restored, and if the rules of 'Hangul' and 'Korean' are newly developed and established, then 'Hangul' and 'Korean' will be able to accurately express all languages and all sounds in the world exactly as they are, with almost 100% due to the unique nature of the language. Then, 'Hangul' and 'Korean' can perform the hub role for all existing languages around the world and may be used as an official language all over the world.

When typing a Romanized language including English on the keyboard according to an embodiment of this invention, any layout can be applied in a variety of ways, such as laying out alphabetic consonants and vowels of the language in a QWERTY format, or laying out alphabetic consonants and vowels of the language in a sequential order, or laying out it as desired by the user on the keyboard unit.

When typing a Romanized language including English on a keyboard according to an embodiment of this invention, it appears to be more desirable to lay out alphabetic consonants and vowels in a sequential order rather than in a QWERTY format as the sequential layout makes it easier for the user to recognize the positions of character and enter characters efficiently.

FIGS. 9A and 9D shows a keyboard of respective countries using a Romanized language according to an embodiment of this invention.

FIG. 9A shows a keyboard layout for French. (1) Keyboard for French version 1 lays out variant characters in the F keys section and additional keys for each editing functions in the additional keys section. (2) Keyboard for French version 2 lays out some of variant characters in the additional keys section and the rest of the variant keys and symbols in the F keys section. Both version of keyboard layouts don't require pressing the function key such as Shift key or Alt key, etc. when entering any French character and can input every French character with single stroke efficiently.

(1) When the additional keys are pressed once, an edit function on the keyboard for French version 1 is performed. (2) When the additional keys are pressed once, character or symbol is inputted, and when the additional keys are pressed and held down for over 0.2 seconds, editing function is performed on the keyboard for French version 2, since the characters are assigned in the additional keys section for performing the editing function.

FIG. 9B shows an example of a keyboard layout for Portuguese version 1 (1) and Portuguese version 2 (2). FIG. 9C shows an example of a keyboard layout for German version 1 (1) and German version 2 (2). FIG. 9D shows an example of a keyboard layout for Spanish version 1 (1) and Spanish version 2 (2). The operation of each version is performed in the same way as the keyboard for French version 1 (1) and French version 2 (2).

If the characters of a certain language can't be fully covered with the character keys section, F keys section and additional keys section, press F+α key to convert the F keys section and assign the remaining characters. The user can lay out characters with high frequency on the default page of the F keys section and the remaining characters with low frequency on the following pages which are displayed on the F keys when the F+α key is pressed.

When typing a non-Romanized language such as Cyrillic, Greek, Japanese or Arabic, etc. on the keyboard according to an embodiment of this invention, the user can lay out the characters constituting the language in the character keys section in a conventional way, in an alphabetical order or in the existing QWERTY format depending on the user's preference.

FIGS. 10A and 10B show a keyboard layout for a non-Romanized language such as Cyrillic, Greek, or Japanese, etc. according to an embodiment of this invention.

FIG. 10A shows a keyboard layout for Russian version (1) and Greek version (2). FIG. 10B shows a keyboard layout for Chinese Pingying version (China) (1), Chinese Pingying version (Taiwan) (2) and Japanese version (3).

When typing letters on the keyboard, a skillful user put both his hands on the 2nd line of the character keys section and slightly moves his fingers left, right, up and down to press the desired key. Even a user who is well acquainted with the positions of keys on the keyboard can perform typing even without looking at the keyboard.

Period '.' and comma ',' are essentially used when composing a sentence in almost all languages in the world. However, as these marks are located at the lower and right part of the conventional keyboard layout, the user has to move his right hand off the 2nd line of the character keys section which is default location to reach his finger to these marks which is located at the lower part of the keyboard and inputs period '.' and comma ',', and then return his right hand to the original position to continue typing. In this process most of the users take their eyes off the monitor and look at the keyboard, so the flow of input is interrupted. Therefore, placing the period '.' and comma ',' in the middle key of the 1st line will enable the user to type the period '.' and comma ',' without taking off eyes from the monitor and without moving the hand off the 2nd line. There is an advantage that the flow of character input can be efficiently input without interruption.

The user can place the period '.' and comma ',' vertically or horizontally in the middle of the 1st line of the character key section consecutively, or vertically or horizontally on a single key. Or the user can assign either the period or comma to a single key. FIG. 4A shows an example of a keyboard layout according to an embodiment of this invention, in which the period '.' and comma ',' are located at the middle keys 160, 161 in the 1st line of the character keys section.

In this invention, for a language that has uppercase and lowercase letters, the case conversion is made using the upper/lower case shift key 170. The user enters lowercase letters by default and needs to press the upper/lower case shift key to enter an uppercase letter as necessary.

The user can press the Caps Lock key as in the conventional way for case conversion. While typing in lowercase letters, when the Caps Lock key is pressed, all the characters laid out on the keyboard are converted to uppercase letters and uppercase letters is inputted. To input lowercase letters again, press the Caps Lock key to convert the letters on the keyboard to lowercase letters and continue typing.

Another conventional way for case conversion is using the Shift key. When if the lowercase letter key in combination with the Shift key is pressed, while inputting the lowercase letter, the lowercase letter is converted to an uppercase letter, and when if the uppercase letter key in combination with the Shift key is pressed, while inputting the uppercase letter, the uppercase letter is converted to the lowercase letter. At this time, the Shift key and the character key must be pressed at the same time, if the finger is temporarily off from the Shift key, the case conversion fails, which requires correction and the flow of character input is interrupted.

In this invention, with the cursor located at the end of a letter or word inputted in lower case, when the upper/lower case shift key is pressed once, the aforementioned letter or word will be converted into upper case. At this time, a letter or word inputted before the space is not affected and remains in lower case. Also, with the cursor located at the end of a letter or word inputted in upper case, when the upper/lower case shift key is pressed once, the aforementioned letter or word will be converted into lower case. Similarly, a letter or word inputted after the space is only affected.

When a letter, word, paragraph or page typed in lower case to be case converted is selected, and the upper/lower case shift key is pressed, and then the selected range will be case converted regardless of a space. Similarly, when a letter, word, paragraph or page typed in upper case to be case converted is selected, and the upper/lower case shift key is pressed, and then the selected range will be case converted regardless of spaces.

When the upper/lower case shift key is pressed repeatedly (e.g., double click, etc.), and the entire letters or word typed before the cursor in the line where the cursor is currently located, and the case of the aforementioned letters or word will be case converted in such way that the lowercase letters are converted into uppercase letters and uppercase letters are converted into lowercase letters.

Using the upper/lower case shift key 170, it is not necessary to press the Caps Lock or Shift key for case conversion, and even it doesn't need to convert all the keys in the character keys section into upper case or lower case. As the user can convert the lower case to upper case or upper case to lower case of a required letter or word while typing letters. It is possible to input characters very efficiently without interrupting the flow of inputting characters.

FIGS. 11A and 11B show examples of using the upper/lower case shift key on a keyboard according to an embodiment of this invention.

As shown in FIG. 11A, when the upper/lower case shift key is pressed once, after the word 'korea' is inputted and the cursor is at the end of the word, and it will be converted to upper case 'KOREA'. When the upper/lower shift key is pressed once, after the word 'APPLE' is inputted and the cursor is at the end of the word, and it will be converted to lower case 'apple'.

As shown in FIG. 11B, if the cursor is positioned after the sentence 'have a nice day', and when the upper/lower case shift key is pressed repeatedly, and then the entire word or sentence before the cursor in the line where the cursor is currently located is case converted into 'HAVE A NICE DAY'. In case of a word or sentence in upper case, and when the upper/lower case shift key is pressed repeatedly, it will convert the case of the entire word or sentence before the cursor in the line where the cursor is currently located into lower case.

Comparing the way of using the existing Caps Lock key with the way of using the upper/lower case shift key to convert case according to an embodiment of this invention is as follows.

For example, the way of using the existing Caps Lock key is, when typing a phrase 'The New Science of Exercise', the user has to press the Caps Lock key whenever the case is converted. More specifically, the user has to press the Caps Lock key once to switch to uppercase input state and type 'T', then press the Caps Lock key again to switch to lowercase input state and type 'he'. Next, he has to press the Caps Lock key again to switch to uppercase input state and type 'N', and then press the Caps Lock key once again to switch to lowercase input state and type 'ew'. In this way, the user has to press the Caps Lock key before and after typing 'S' and 'E'. Therefore, the user has to press the Caps Lock key 8 times in total in this case.

In the way of using the upper/lower case shift key of this invention, as letters are entered in lower case by default, type 't' first and when the upper/lower case shift key is pressed once and the letter 't' will be case converted to 'T'. At this time, as the keyboard unit is not converted to the uppercase input state, but the lowercase input is maintained, so the user just needs to continue typing 'he' and 'n' without any additional operation. Then, when the upper/lower case shift key is pressed again and the letter 'n' will be case converted to 'N'. At this time, the upper/lower case shift key only affects a letter or word typed after a space is inserted and does not affect what is typed before a space is entered and it remains in lowercase. Then type 'ew' and 's' and when the upper/lower case shift key is pressed once again and the letter 's' will be case converted to 'S'. Type 'cience of' and 'e', and when the upper/lower case shift key is pressed once again, the case of the letter 'e' is converted to 'E'. Finally, type 'xercise' and typing will be completed. So, in this method, the user only needs to press the upper/lower case shift key four times while typing the aforementioned phrase.

Using the upper/lower case shift key can reduce the number of times of pressing the key by half compared to the number of times of pressing the Caps Lock key, which demonstrates that the upper/lower case shift key is more efficient. In addition, in the process of inputting characters, only necessary characters are changed to uppercase, and the flow of character input can be continued without interruption. Besides, as this method can convert the case of the entire letters or word at once regardless of the number of letters, it makes easier to convert between uppercase and lowercase.

Another feature of this invention relates to the integrated parenthesis key 180 for easily inputting various parenthesis symbols.

On conventional keyboard, an open parenthesis symbol '(' and a closed parenthesis symbol ')' are placed separately in the two keys. To enter a parenthesis '( )', the open parenthesis symbol '(' key has to be pressed while the Shift key is held down, and then the closed parenthesis symbol ')' key has to be pressed while the Shift key is held down, respectively.

In this invention, various integrated parenthesis symbol including the open parenthesis symbol '(' and closed parenthesis symbol ')' are assigned to the integrated parenthesis key 1 180 to ensure efficient use of space on the keyboard and enable inputting parenthesis symbols without pressing the Shift key.

When the integrated parenthesis key 1 180 is pressed once, an open parenthesis symbol '(' is entered. When the integrated parenthesis key 1 is pressed once again, after the letters to be input in the parenthesis is typed, the closed parenthesis key ')' is entered to complete the parenthesis symbol.

FIG. 12A shows an example of entering a parenthesis symbol by pressing the integrated parenthesis key 1 on a keyboard according to an embodiment of this invention.

To input parenthesis symbols consecutively on the keyboard, press the integrated parenthesis key 1 once to enter an open parenthesis symbol '(' and press the integrated parenthesis key 1 repeatedly, and the open parenthesis symbols will be inserted consecutively like '(('. After inserting open parenthesis symbols, press the integrated parenthesis key 1 the same number of times as the open parenthesis symbols are inputted, and the same number of closed parenthesis symbols ')' will be entered.

FIG. 12B shows an example of entering parenthesis symbols consecutively by pressing the integrated parenthesis key 1 on a keyboard according to an embodiment of this invention.

Also, in this invention, the integrated parenthesis key 2 181 may be used as an easy way to enter various parenthesis symbols. The integrated parenthesis key 2 comprises the following 4 parenthesis keys; '( )', '{ }', '[ ]' and '< >'. When each parenthesis key is pressed once, the corresponding open parenthesis symbol will be inputted. When the each parenthesis key is pressed once again, a corresponding closed parenthesis symbol will be inputted.

FIG. 12C shows an example of entering a parenthesis symbol by pressing the integrated parenthesis key 2 on the keyboard according to an embodiment of this invention. 4 parenthesis keys may be laid out vertically or horizontally as shown in FIG. 12C or may be modified and laid in a different way. To describe how to use these keys, the parenthesis symbol '( )' will be illustrated as follows. When the '( )' key is pressed once and an open parenthesis symbol '(' will be entered. When the '( )' key is pressed again after 'Good morning' letter is entered after the open parenthesis symbol, a closed parenthesis symbol ')' will be entered. Using the remaining 3 keys of '{ }', '[ ]', and '< >' in the integrated parenthesis key 2 follows the same procedures as stated above.

In this method, it is not necessary to press the Shift key to enter '( )', '{ }', '[ ]' or '< >' and the user simply only needs to press the integrated parenthesis key twice to put each of the parenthesis symbol.

In addition, to enter any parenthesis symbol among the 4 symbols of '( )', '{ }', '[ ]' and '< >' included in the integrated parenthesis key 2 of the keyboard unit in a consecutive manner, press a desired parenthesis key once to insert an open parenthesis symbol and press the key repeatedly to insert the open parenthesis symbol consecutively. After entering the open parenthesis symbols, pressing the same integrated parenthesis key each time inputs the closed parenthesis symbols corresponding to the open parenthesis symbols.

FIG. 12D shows an example of entering parenthesis symbols consecutively by pressing the integrated parenthesis key 2 on a keyboard according to an embodiment of this invention.

Parenthesis symbols of '[', ']', '{', '}', '<' and '>' are printed on different keys on a conventional keyboard. If the user wants to insert '{', '}', '<' or '>', the user has to press the applicable key in combination with the Shift key. Moreover, to enter a parenthesis not printed on the keyboard, the user has to search the desired symbol in the special character table and select the open parenthesis symbol to input, and after typing letters, the user has to search the desired symbol in the special character table and select the closed parenthesis symbol to input again, which is quite cumbersome and inconvenient.

Like the parenthesis '( )', a lot of parenthesis symbols consist of an open parenthesis symbol and a closed parenthesis symbol as a pair. In this invention, several parenthesis symbols may be integrated into the integrated parenthesis key 1 180 or integrated parenthesis key 2 181. This makes it easier to find various parenthesis symbols and insert them without pressing the Shift key, which also ensures efficient use of space on the keyboard. To enter a certain parenthesis symbol, when the integrated parenthesis key 1 or the integrated parenthesis key 2 is pressed and held down for over 0.2 second, a parenthesis symbols display 182 with various parenthesis symbols is displayed on the display unit. In case of the integrated parenthesis key 2, press and hold down any of the '( )', '{ }', '[ ]' and '< >' keys for over 0.2 seconds. Hereinafter, pressing the integrated parenthesis key 2 refers to pressing any of the '( )', '{ }', '[ ]' and '< >' keys.

A number of pairs of open symbols and closed symbols may be displayed on the parenthesis symbols display. When a pair of certain parenthesis symbols is selected, the open symbol of the selected parenthesis is inserted. At this point, if the pair of parenthesis symbols is numbered, when the number is entered, the open symbol of the selected parenthesis is inserted.

FIGS. 13A and 13B show examples of entering various parenthesis symbols by pressing the integrated parenthesis key 1 or the integrated parenthesis key 2 on a keyboard according to an embodiment of this invention.

FIG. 13A shows an example of displaying a parenthesis symbols display on the display unit when the integrated parenthesis key 1 or the integrated parenthesis key 2 is pressed and held down for over 0.2 seconds to input a certain parenthesis symbol. For example, when ' 《 》 ' is pressed, the open symbol of ' 《' is inserted. After letters or words to be entered between the parenthesis symbol ' 《 》 ' is entered, to complete the closed parenthesis symbol '》 ', press the integrated parenthesis key 1 or the integrated parenthesis key 2. FIG. 13B shows an example of inserting the closed symbol '》 ', when the integrated parenthesis key 1 or the integrated parenthesis key 2 is pressed.

In this way, in inputting a large number of parentheses, it is possible to reduce the cumbersome task of finding open parentheses and closed parentheses for each parenthesis symbol, and to complete parenthesis symbol, it can be completed with pressing the integrated parenthesis key 1 or the integrated parenthesis key 2.

This invention lets the user insert another parenthesis symbol in a parenthesis symbol. First, when the integrated parenthesis key 1 or the integrated parenthesis key 2 is pressed and held down for over 0.2 seconds, displays a parenthesis symbols display on the display unit.

Then, when the first pair of parenthesis symbols to be inserted is pressed, and the applicable open symbol will be inserted. When the second pair of parenthesis symbols to be inserted is pressed, the applicable open symbol will be inserted. In a similar way, the user can insert the open symbol of a certain parenthesis by pressing the applicable pair of parenthesis symbols. To insert the same parenthesis consecutively, press the applicable pair of parenthesis symbols displayed on the parenthesis symbols display repeatedly, and the corresponding open symbols will be inserted in a consecutive manner. To insert the corresponding closed parenthesis symbol, pressing the integrated parenthesis key 1 or the integrated parenthesis key 2 each time inputs closed parenthesis symbol in reverse order corresponding to the open parenthesis symbol and parenthesis can be completed.

FIGS. 14A and 14B show examples of entering various parenthesis symbols consecutively by the integrated parenthesis key 1 or the integrated parenthesis key 2 on a keyboard according to an embodiment of this invention.

When the integrated parenthesis key 1 or the integrated parenthesis key 2 is pressed and held down for over 0.2 seconds, the parenthesis symbols display is displayed on the display unit. When a parenthesis symbol on the parenthesis symbols display is left clicked with a mouse or touched with a finger or electronic pen device to drag it out of the parenthesis symbols display, and then, when the clicked or touched parenthesis symbol is released, generates a complete parenthesis with open and closed parenthesis symbols and inputs the complete parenthesis on the display unit.

For example, when the '< >' pair on the parenthesis symbols display is clicked or touched, and dragged it out of the parenthesis symbols display, and when click is released, and then a parenthesis '< >' is inputted on the display unit. In this case, the cursor is automatically located between the open parenthesis symbol '<' and the closed parenthesis symbol '>' like '< | >', which lets the user type letters or words directly between the parenthesis '< >'. Using this method, with the parenthesis symbol display is opened, the user can input the necessary parenthesis symbol on the display unit at once, and do the work.

Another feature of this invention relates to its functionality to insert various symbols in an efficient manner.

In the conventional way, to insert various symbols, it is required to run a software program in which symbols are stored, or navigate to the table of special characters and select the symbol to input. In the meantime, this invention features an integrated symbol key 190 on the keyboard unit. When the integrated symbol key is pressed, a symbols display 191 is displayed on the display unit. The symbols display includes a list of symbol categories 192 and multiple number of symbols corresponding to the list of symbol categories to make it easier and faster for the user to select and insert a desired symbol.

FIG. 15 shows the symbols display displayed on the display unit when the integrated symbol key is pressed on the keyboard according to an embodiment of this invention. In FIG. 15, a unit symbol is selected in the list of symbol categories and various units symbols corresponding to the selected unit symbol category are displayed. Therefore, the user can select a unit symbol directly and input on the display unit. When user changes the symbol category of the symbols display, the corresponding symbols are changed and displayed, so that the user can easily select and input various symbols. Using the integrated symbol key, the user can select and input various symbols, special characters, shapes, unit symbols, arrows, punctuation marks and circled characters directly.

The present invention can easily input the currency symbol (currency unit) of each country. The keyboard according to an embodiment of this invention features an integrated currency key 200 in the keyboard unit. When a language is selected by pressing the language conversion key, the corresponding currency to the selected language is displayed on the integrated currency key. At this time, when the integrated currency key is pressed once, the user can insert the currency unit. When the integrated currency key is pressed and held down for over 0.2 seconds or pressed repeatedly, a currency unit display 201 which lists all currency units will be displayed on the display unit, on which the user can select a desired currency unit to insert.

FIG. 16 shows the currency unit display on a keyboard according to an embodiment of this invention.

This invention features a translation key 210 on the keyboard unit. After entering a letter and selecting a range to be translated such as a word, sentence, paragraph or page, etc. and then when the translation key is pressed, the language will be translated to another language.

When the translation key is pressed and held down for predetermined period, translation key setting display 211 will be displayed on the display unit. The translation key setting display may feature the source language, target language and a worldwide languages list. In the source language field, the language currently set for the keyboard is displayed. In the target language field, the language to be translated will be displayed if the translation key is pressed. The user can select a language in the worldwide languages list and register in or delete from the target language field. When the user first registers the language to be translated and then presses the translation key, the current language is translated into the language to be translated.

FIG. 17A shows the translation key setting display and an example of translation when the translation key is pressed according to an embodiment of this invention.

The present invention can input characters and simultaneously translate them into languages of various countries at the same time. This function is useful to a person who is learning multiple languages or is useful to a person who translate simultaneously in different languages at the same time. After registering several languages in the target language field on the translation key setting display, when the user select a range to be translated after inputting characters and when the translation key is pressed, the translated characters are displayed in a plurality of languages in the display unit. At this time, the translation is performed in the order registered in the target language. FIG. 17B shows an example of translation into multiple languages simultaneously by pressing the translation key.

This invention lays out the circle (○) key 221, square (□) key 222 and triangle (△) key 223 on the keyboard unit (hereinafter referred to as Won-Bang-Gak keys which can be defined as a shape extension key). When one of the Won-Bang-Gak keys is pressed, a data display 224 will be displayed, and the data display includes a data list and data titles 255, and corresponding data or functions 226 are displayed, which lets the user select and input a desired one without navigating to it.

When typing with a keyboard, people often have to type not only letters to type the language but professional expressions. For example, if the keyboard user is creating a document about physics, the user might have to insert physics formulas, if the keyboard user is creating a document about chemicals, the user might have to insert chemical formulas, or if the keyboard user is creating a document about mathematics, the user might have to insert mathematical formulas. In such situation, it is quite cumbersome and takes too much time to enter each of such physics formulas, chemical formulas or mathematical formulas manually. Thus, it could significantly reduce input time by selecting and recalling the formula that is the most similar to the formula that user want to input from 100 or 200 numbers of the physical formulas, chemical formulas, and mathematical formulas which is already input and by modifying to fit user's own needs and inputting.

Formulas may be registered at the time of production or be registered additionally or deleted from the Won-Bang-Gak keys by the user later.

Alternatively, various data may be categorized into Won-Bang-Gak keys and be displayed on the data display by category. For example, professional medical terms may be stored in the Won-Bang-Gak keys and the user can select and input a desired one among them without inputting it manually. Musical notes, symbols, forte and piano symbols may be listed in the Won-Bang-Gak keys. Or, cooking recipes or the periodic table which is often used in chemistry, may be stored in the Won-Bang-Gak keys and can be selected and inputted by user.

User-specified photos and video clips, or commonly used boilerplates also may be stored in the Won-Bang-Gak keys. Even symbols, marks and shapes that are created by the user may be stored.

FIG. 18A shows the data display on the display unit to register and delete data to the circle symbol (○) key among the Won-Bang-Gak (○□△) keys on a keyboard according to an embodiment of this invention. When the circle (○) key is pressed, the data display 224 will be displayed on the display unit. The data display 224 displays a data corresponding to a mathematical formula, which is a data title selected from the data list 225 and various data titles included in the data list. The user can select a desired formula to input. If each formula is numbered, select the number to input the corresponding formula. If a any data title in the data list is selected, the corresponding data will be displayed on the data display.

The user can register data in the Won-Bang-Gak keys as follows. Press any of the Won-Bang-Gak keys, and the data display 224 will be displayed on the display unit, on which a data list, data titles and corresponding data are displayed. To register data in a certain data title, the user can import data from stored data in the storage unit or user can input it directly and register.

If one or more data titles exist in the data list, the user can categorize them into either activated or deactivated. In this case, when the Won-Bang-Gak keys is pressed each time, the data titles along with corresponding data in the activated category is converted and displayed in predetermined order.

FIG. 18B shows an example of data display prompted when the square (□) key is pressed. In FIG. 18B, physics formulas, chemical formulas and the periodic table are registered as activated among data list. Therefore, when the square (□) key is pressed once, the data display for physics formulas is displayed, and when the square (□) key is pressed once again, the data display for chemical formulas is displayed, and when the square (□) key is pressed once again, the data display for the periodic table is displayed, and when the square (□) key is pressed once again, the data display for physical formulas is displayed again. The same mechanism will also apply to the circle key and the triangle key.

The user also can register desired data or link a function through the combination of pressing 2 keys simultaneously, such as circle (○) key plus square (□) key, square (□) key plus triangle (△) key or circle (○) key plus triangle (△) key, or the combination of pressing 3 keys simultaneously ((○)+(□)+(△)). For example, as depicted in FIG. 18C, when the circle (○) key and the square (□) key is pressed simultaneously, a data display for video clips is displayed.

Alternatively, when the circle (○) key and the triangle (□) key is pressed simultaneously, a data display for music files may be displayed. Then, the user can play the music file directly without going through various paths. Alternatively, when the square (□) key and the triangle (△) key is pressed simultaneously, a data display for photos is displayed and photo can be used directly.

Using the Won-Bang-Gak keys as stated above, the user can configure a user-oriented keyboard which is optimized for himself according to special needs of his own.

As depicted in (1) and (2) of FIG. 10B, when inputting Chinese, this invention features a traditional-simplified Chinese shift key 230 on the keyboard unit. When the traditional-simplified Chinese shift key is pressed after a traditional Chinese character is inputted and a cursor is placed after the inputted character, the one or more characters before the cursor are converted from traditional Chinese characters to simplified Chinese characters. When the traditional-simplified Chinese shift key is pressed after a simplified Chinese character is inputted and a cursor is placed after the inputted character, the one or more characters before the cursor are converted from simplified Chinese characters to traditional Chinese characters. Or when the traditional-simplified Chinese shift key is pressed, the entire contents inputted can be converted from traditional Chinese characters to simplified Chinese characters, or converted from simplified Chinese characters to traditional Chinese characters.

FIG. 19 shows an example of the traditional-simplified Chinese shift key when inputting Chinese on the keyboard according to an embodiment of this invention. If the traditional-simplified Chinese shift key is set to 'traditional Chinese', the letter will be typed in traditional Chinese. If the traditional-simplified Chinese shift key is set to 'simplified Chinese', the letter will be typed in simplified Chinese.

On the keyboard according to an embodiment of this invention, the user can register the secondary data or function desired by the user to each key in the keyboard unit in advance, and when the each key is pressed and held down for predetermined period, the secondary data or function is inputted or executed.

When each key on the keyboard unit is pressed once, an assigned phoneme or symbol for the selected language according to the language conversion key is inputted or an assigned function is executed. When each key is pressed and held down for predetermined period, pre-registered secondary data is inputted or pre-registered function is executed.

FIG. 20 shows presetting the secondary data or function to each key of the keyboard unit according to an embodiment of this invention. First, displays the keyboard setting display 240 on the display unit. For example, when the Esc key is pressed and held down for predetermined period, the keyboard setting display will be displayed. Primarily setting, each key should be assigned with a phoneme, symbol or function for the language selected with the language conversion key. Select a key to configure and register data or function in the secondary settings. It is desirable to pre-register 10 to 20 data or functions to a single key in numerical order. When the key is pressed and held down for predetermined period, the data registered in the (1) spot will be inputted or the function registered in the (1) spot will be executed. If presetting 10 to 20 data or functions in advance, the user just needs to switch the required pre-registered data or function to the (1) spot, rather than registering it whenever it is needed.

In the example depicted in FIG. 20, 'U' is selected in the keyboard setting display, and '(' 1) ※ (2) ♡ (3) 01.mp3 (4) 01.jpg (5) 01.AVI (6) Internet connection (7) Open Inbox (8) Take photo (9) Dictionary (10) Voice recording' is registered in the second setting. When the 'U' key is pressed once, and a letter 'U' will be entered. When the 'U' key is pressed and held down for predetermined period, '※ registered in the (1) spot will be entered.

If the user registers the '01.mp3' music file to the (1) spot, when the 'U' key is pressed once, and a letter 'U' will be entered, and when the 'U' key is pressed and held down for predetermined period the '01.mp3' music file on the (1) spot can be inputted or played.

As stated above, the user can register frequently used data or function, such as letter, symbol, picture, photo, emoticon, music file or video clip, etc. in each key on the keyboard unit in advance. When the key is pressed and held down for predetermined period, the registered data or function is inserted or executed, or users can connect frequently used functions and use them immediately. User-customized functions can be executed quickly, for example, the user can take a photo when the 'C' key is pressed and held down for predetermined period, open a dictionary when the 'D' key is pressed and held down for predetermined period, connect to the Internet when the 'E' key is pressed and held down for predetermined period, open the inbox when the 'M' key is pressed and held down for predetermined period, perform printing when the 'P' key is pressed and held down for predetermined period, start voice recording when the 'R' key is pressed and held down for predetermined period, start scanning when the 'S' key is pressed and held down for predetermined period or start video recording when the 'V' key is pressed and held down for predetermined period, etc.

Besides, according to an embodiment of this invention, such function may be used on a keyboard for which the language conversion key is deactivated and one language is fixed or two languages are fixed and converted.

Embodiments of this invention may be applied in various ways including a touch display-based method or a hologram method.

INDUSTRIAL APPLICABILITY

This invention can be used as a multilingual character input device which assigns software-based regularity and scalability, and may be used as a convenient and efficient multilingual character input device for worldwide languages.

In addition, the present invention can be used as a user-customized keyboard in which a user can change his/her desired character or symbol and register or delete the desired character or symbol.

What is claimed is:

1. A multilingual character input device, comprising:
   a keyboard unit for displaying character phonemes converted from characters per language on a key and selectively receiving the input of the displayed character phonemes;
   a display unit for displaying the received input character on a display;
   a storage unit for storing character phonemes, a list of data and a program; and,
   a control unit for controlling the keyboard unit, the display unit and the storage unit,
   wherein, the keyboard unit comprises:
      a numeric/symbol keys section for displaying numbers and symbols disposed at an upper part;
      an F keys section disposed below the numeric/symbol keys section for displaying functions, characters or preset functions;
      a character keys section disposed below the F keys section for displaying basic phonemes of each language; and
      a plurality of additional keys in the character keys section for displaying variant phonemes or preset symbols,
   wherein if language conversion is performed through a language conversion key of the keyboard unit, a language exceeding the phoneme number of the character keys section is assigned to the F keys section and the plurality of additional keys so as to display all character phonemes, so that the input of the characters for each language is received by one key stroke.

2. The multilingual character input device as claimed in claim 1,
   wherein the keyboard unit comprises a conversion key or function keys with a preset function to register and delete a function or data in advance.

3. The multilingual character input device as claimed in claim 2,
   wherein the F keys section comprises an F+α key and an addible plurality of F keys,
   wherein the keyboard unit displays an original function of the plurality of F keys, if the F+α key is not activated, and
   wherein the keyboard unit displays a F keys of an added function or a character phoneme in predetermined order according to the number of the F+α key is pressed.

4. The multilingual character input device as claimed in claim 3,
   wherein if the F+α key is pressed and held down for a predetermined period, the display unit displays a setting display, so that one or more functions or characters displayed on each of the F keys are registered or deleted, and a display order of the F keys on the keyboard unit is configurable.

5. The multilingual character input device as claimed in claim 2,
   wherein the plurality of additional keys are used for inputting a basic character, a variant character, a special character, a symbol, a mark, a picture and a photo; or wherein the plurality of additional keys are used for setting a function key, or the plurality of additional keys are used for performing an editing function including a whole selection, copying, saving, pasting, cutting and undoing.

6. The multilingual character input device as claimed in claim 2,
wherein the numeric/symbol keys section is a section for directly inputting the number or the symbol, and
the symbols displayed on the entire numeric/symbol keys of the numeric/symbol keys section are converted to the numbers, or the numbers displayed on the entire numeric/symbol keys of the numeric/symbol keys section are converted to the symbols, if one or more keys of the numeric/symbol keys section are pressed and held down for a predetermined period.

7. The multilingual character input device as claimed in claim 2,
wherein the numeric/symbol keys section includes a numeric/symbol conversion key having a toggle function.

8. The multilingual character input device as claimed in claim 2,
wherein the F keys section and the numeric/symbol keys section comprise one or more keys with an additional function in addition to original keys, and
wherein the one or more keys with an additional function are assigned a user-defined keys for registering and deleting data in advance.

9. The multilingual character input device as claimed in claim 8,
wherein if two of the user-defined keys are pressed simultaneously, the display unit displays a setting display, so that a plurality of data displayed on each key are registered or deleted, and,
wherein if each key of the user-defined keys is pressed and held down for a predetermined period, a plurality of pre-registered data are converted and displayed on the each key in predetermined order at a predetermined time interval, and if pressed key is released, corresponding data is displayed on the each key.

10. The multilingual character input device as claimed in claim 1,
wherein a period and comma are located in the middle of the first row of the keyboard unit,
wherein the period and comma are vertically or horizontally disposed on two consecutive keys,
wherein the period and comma are vertically or horizontally disposed on a single key, or
wherein the period or comma is disposed on a single key.

11. The multilingual character input device as claimed in claim 1,
wherein the keyboard unit includes upper/lower case shift key, and
wherein if the character or word is input and the upper/lower case shift key is then pressed, the character or word input after a blank is converted into an upper or lower case,
wherein a conversion range is selected and the upper/lower case shift key is then pressed to convert the character or word corresponding to the selected conversion range, or
wherein if the upper/lower case shift key is pressed repeatedly after the character is input, all characters or words before a cursor are converted.

12. The multilingual character input device as claimed in claim 1,
wherein the keyboard unit includes an integrated parenthesis key for performing an open parenthesis function and a closed parenthesis function,
wherein if the integrated parenthesis key is pressed once, an open parenthesis symbol is input, and then if the integrated parenthesis key is pressed once again, a closed parenthesis symbol corresponding to the open parenthesis symbol is input.

13. The multilingual character input device as claimed in claim 12,
wherein if the integrated parenthesis key is pressed repeatedly, consecutive open parenthesis symbols are input, and then each time the integrated parenthesis key is pressed, the closed parenthesis symbol is input in a reverse order to correspond to the consecutive open parenthesis symbols.

14. The multilingual character input device as claimed in claim 1,
wherein the keyboard unit includes an integrated currency key, and
wherein the integrated currency key is interoperated with the language conversion key and a corresponding currency symbol is displayed if language conversion is performed.

15. The multilingual character input device as claimed in claim 1,
wherein the keyboard unit includes a translation key for translating a language into another language if one or more characters are input and then a range to be translated is selected.

16. The multilingual character input device as claimed in claim 1,
wherein a secondary data or function is assigned to each key of the keyboard unit in advance, and
wherein if the key is pressed and held down for predetermined period, the secondary data or function is activated.

\* \* \* \* \*